United States Patent [19]

Kinuhata et al.

[11] Patent Number: 5,005,628
[45] Date of Patent: Apr. 9, 1991

[54] METHOD FOR CORRECTING TIRE DEFLECTION IN TIRE GROOVING AND APPARATUS THEREFOR

[75] Inventors: Satoru Kinuhata; Masao Takami, both of Kobe; Eiji Shibata, Nakama; Tadahiko Tamura, Kitakyushu, all of Japan

[73] Assignee: Sumitomo Rubber Industries Inc., Kobe, Japan

[21] Appl. No.: 432,405

[22] Filed: Nov. 6, 1989

Related U.S. Application Data

[63] Continuation of Ser. No. 285,557, Dec. 16, 1988, abandoned.

[30] Foreign Application Priority Data

Dec. 19, 1987 [JP] Japan .................. 62-322202
May 30, 1988 [JP] Japan .................. 63-134026
May 30, 1988 [JP] Japan .................. 63-134027

[51] Int. Cl.⁵ .......................... B29H 21/08
[52] U.S. Cl. ................................ 157/13
[58] Field of Search .......................... 157/13

[56] References Cited

U.S. PATENT DOCUMENTS

| | | | |
|---|---|---|---|
| 3,426,828 | 2/1969 | Neilsen | 157/13 |
| 4,147,196 | 4/1979 | Jarry | 157/13 |
| 4,237,955 | 12/1980 | Clayton | 157/13 |
| 4,782,881 | 11/1988 | Brinkley et al. | 157/13 |

FOREIGN PATENT DOCUMENTS 62-74635 4/1987 Japan .

Primary Examiner—James G. Smith
Attorney, Agent, or Firm—Armstrong, Nikaido, Marmelstein, Kubovcik & Murray

[57] ABSTRACT

A method and an apparatus for compensating a radial deflection and/or a lateral deflection in tire grooving wherein a cutter movement is controlled by a plurality of operating shafts and a desired pattern grooves are formed in a tire surface, wherein the radial deflection in a direction along diameter of the tire, which is supported by a tire supporting shaft, and/or the lateral deflection in a direction along diameter of the tire are detected before or during tire grooving, an a radially driving member, which moves a cutter in a direction along diameter of the tire, and/or a laterally driving member, which moves a cutter in a direction along width of the tire, are actuated in accordance with a reference program, and concurrently a movement of the radially driving member and/or a movement of the laterally driving member are adjusted in accordance with a correction program based on the detected deflection value in order to follow the radial deflection and-/or the lateral deflection. The method and apparatus forms a groove having a desired constant depth and a desired constant width at a desired constant position from the tire tread center and simplifies the structure of the program to allow a smaller size of the apparatus.

9 Claims, 23 Drawing Sheets

METHOD FOR CORRECTING TIRE DEFLECTION IN TIRE GROOVING AND APPARATUS THEREFOR

This application is a continuation-in-part of application Ser. No. 285,557 filed Dec. 16, 1988, now abandoned.

BACKGROUND OF THE INVENTION

The present invention relates to a method and an apparatus for correcting or compensating a cutter position for a radial deflection, in which a tire surface subjected to cutting deviates in the radial direction, and/or a lateral deflection, in which a tire surface subjected to cutting deviates in the lateral direction, in a tire grooving operation.

An apparatus for grooving in a tread surface of a new tire or a re-treaded tire has, in general, a tire supporting shaft, which supports a tire in a vertical posture, and a cutter unit, of which at least the lateral movement in the direction parallel with the tire supporting shaft and the radial movement in the direction perpendicular to the tire supporting shaft are allowed.

However, a tire itself, in general, does not have an accurate roundness, a tire tread surface is sometimes inclined to a certain degree and the tire is sometimes supported in a deviated condition and therefore, a radial distance from the center of the tire supporting shaft to the tread surface is not constant. Accordingly, radial deflection of the tread surface in the radial direction is caused. In the above situation, a tire grooving, wherein the cutter movement is controlled in accordance with a prespecified tread pattern shape by a set-up program with a tire being rotated, cannot provide constant groove depths for each tire having same size and same specification. Moreover, even if a plurality of grooves having a mutually uniform depth on the left and right sides of the tire equator are required to be formed on one tire, the depths of the grooves on the left side of the equator differ from those on the right side. Thus there is caused a problem in quality that the stability of the tire is impaired and the strength thereof is lowered.

Further, if distortion of, the tire itself and deviation in the tire supporting cause a lateral deflection of the side surface of the tire in the direction of the tire width, a tire grooving, wherein the cutter movement is controlled in accordance with a prespecified tread pattern shape by a set-up program with a tire being rotated, cannot make a groove position keep a constant relationship to the tire tread center for each tire having same size and same specification. Moreover, a deviation of the tire tread center in one tire sometimes results. Thus there is caused a problem in quality that the stability of the tire is impaired and the strength thereof is lowered.

In this connection, there has been proposed another apparatus, for example, as disclosed in Japanese Unexamined Patent Publication No. 74635/1987, wherein there is provided a non-contact type detecting means for detecting the shape of the tread surface, and the cutter position is controlled based on the detected data so that the amount of rubber being cut off from the tire is kept constant.

However, suchlike apparatus has a problem that a large frame for mounting the detecting means are required.

Further the groove depth cannot be kept constant along the entire circumferential length of the groove which is formed on the entire periphery in the circumferential direction of the tire because the cutter position in the direction of the cutting depth is kept constant only at the beginning of the cutting operation.

Moreover, an image detector is used and the cutter position in the cutting operation is determined by calculation based on the area of the tire exposed to the view of the detector in order to allow the constant amount of rubber to be cut off. However, the determination of the cutter position by calculation based on the area is very difficult particularly when the cutter acrosses another groove which has been formed already or when the radial fluctuation on the right side of the tire equator is different from that on the left side, even if the constant amount of rubber to be cut off is purposed. Since the cutter position is not movable in accordance with the radial deflection of the tire, the groove depth and the groove width cannot be kept at respective desired constant values by following the radial deflection of the tire.

Still further, since the cutter position cannot be moved in accordance with the lateral deflection of the tire, the groove position relative to the tread center cannot be kept at a desired constant value by following the lateral deflection of the tire.

An object of the present invention is to provide a method and an apparatus for grooving which provide a groove having desired constant depth and width and being formed at a desired constant position even in case that a tire has a radial deflection and/or a lateral deflection.

In accordance with the present invention, there is provided a method for compensating deflections of a tire in tire tread grooves in the tread of a tire is controlled by a plurality of operating shafts, characterized by the steps comprising moving the cutter with one of the plurality of operating shafts along a non-deflected path to cut the thread grooves in the tire, detecting deflections on the tire and, with the detected deflections, deflecting the path of movement of the cutter with another of the plurality of shafts in accordance with the detected deflection.

In accordance with the present invention, there is also provided an apparatus for compensating deflections of a tire in tire tread grooving wherein movement of a cutter for cutting tread grooves in the tread of a tire is controlled by a plurality of operating shafts comprising one shaft of the plurality of operating shafts for moving the cutter along a non-deflected path to cut the tread grooves on the tire, detecting means for detecting deflections on the tire and means connected to another shaft of the plurality of shafts and the detecting means for deflecting the cutter from the non-deflected path in accordance with the detected deflection.

SUMMARY OF THE INVENTION

The present invention relates to a method and an apparatus for compensating a radial deflection and a lateral deflection of a tire in tire grooving wherein a cutter movement is controlled by a plurality of operating shafts and desired pattern grooves are formed in a tire surface, wherein the radial deflection in a direction along the diameter of the tire, which is supported by a tire supporting shaft, and the lateral deflection in a direction along the width of the tire are detected before or during tire grooving, and a radially driving means, which moves a cutter in a direction along diameter of the tire, and a laterally driving means, which moves the cutter in a direction along width of the tire, are actuated in accordance with a reference program based on a prespecified grooving pattern, and concurrently movements of the radially driving means and the laterally driving means for the cutter are adjusted in accordance with a correction program based on the detected deflection values in order to follow the radial deflection and the lateral deflection of the tire.

In order to achieve the above operation, the apparatus of the present invention has detectors for detecting a radial deflection in a direction along diameter of the tire and a lateral deflection in a direction along width of the tire; a radially driving shaft which is rotated to move a cutter in a direction along diameter of the tire under a control of a reference program (or a main program) and a laterally driving shaft which is rotated to move the cutter in a direction along width of the tire under control of the reference program; and a radially correction shaft and a laterally correction shaft, which are disposed in parallel with the radially driving shaft and the laterally driving shaft respectively, and which are rotated to move the cutter in accordance with a correction program based on the deflection values detected by the detector.

Thus, the radially driving shaft and the laterally driving shaft move the cutter in the direction of tire diameter and in the direction of tire width respectively in accordance with the reference program which specifies the cutter position relative to the standard (or non-defected) tread surface of the tire, and the radially correction shaft and the laterally correction shaft move the cutter in accordance with the correction program which corrects the cutter position based on the deflection values detected by the detectors which detect the radial deflection and the lateral deflection of the tire before or during tire grooving. Then the correction movements of the radially correction shaft and the laterally correction shaft are mechanically superposed respectively on (or incorporated into) the reference movements of the radially driving shaft and the laterally driving shaft so as to correct the cutter position by compensating the radial deflection and the lateral deflection of the tire.

Further, the present invention relates to a method and an apparatus for compensating a radial deflection of a tire in tire grooving wherein a cutter movement is controlled by plurality of operating shafts and desired pattern grooves are formed in a tire surface, wherein the radial deflection in a direction along diameter of the tire, which is supported by a tire supporting shaft, is detected before or during tire grooving, and a radially driving means, which moves a cutter in a direction along diameter of the tire, is actuated in accordance with a reference program based on a prespecified grooving pattern, and concurrently a movement of the radially driving means is adjusted in accordance with a correction program for the cutter based on the detected deflection value in order to follow the radial deflection of the tire.

In order to achieve the above operation, the apparatus of the present invention has a detector for detecting a radial deflection in a direction along diameter of the tire; a radially driving shaft which is rotated to move a cutter in a direction along diameter of the tire under a control of a reference program; and a radially correction shaft, which is disposed in parallel with the radially driving shaft, and which is rotated to move the cutter in accordance with a correction program based on the deflection value detected by the detector.

Thus, the radially driving shaft moves the cutter in the direction of tire diameter in accordance with the reference program which specifies the cutter position relative to the standard tread surface of the tire, and the radially correction shaft moves the cutter in accordance with the correction program which corrects the cutter position based on the deflection value detected by the detector which detects the radial deflection of the tire before or during tire grooving. Then the correction movement of the radially correction shaft is mechanically superposed on (or incorporated into) the reference movement of the radially driving shaft so as to correct the cutter position by compensating the radial deflection of the tire.

Still further, the present invention relates to a method and an apparatus for compensating a lateral deflection of a tire in tire grooving wherein a cutter movement is controlled by a plurality of operating shafts and desired pattern grooves are formed in a tire surface, wherein the lateral deflection in a direction along width of the tire which is supported by a tire supporting shaft, is detected before or during tire grooving, and a laterally driving means, which moves a cutter in a direction along width of the tire, is actuated in accordance with a reference program based on a prespecified grooving pattern, and concurrently a movement of the laterally driving means is adjusted in accordance with a correction program for the cutter based on the detected deflection value in order to follow the lateral deflection of the tire.

In order to achieve the above operation, the apparatus of the present invention has a detector for detecting a lateral deflection in a direction along width of the tire; a laterally driving shaft which is rotated to move the cutter in a direction along width of the tire under a control of the reference program, and a laterally correction shaft, which is disposed in parallel with a laterally driving shaft, and which is rotated to move the cutter in accordance with a correction program based on the deflection value detected by the detector.

Thus, the laterally driving shaft moves the cutter in the direction of tire width in accordance with the reference program which specifies the cutter position relative to the standard tread surface of the tire, and the laterally correction shaft moves the cutter in accordance with the correction program which corrects the cutter position based on the deflection value detected by the detector which detects the lateral deflection of the tire before or during tire grooving. Then the correction movement of the laterally correction shaft is mechanically superposed on (or incorporated into) the reference movement of the laterally driving shaft so as to correct the cutter position by compensating the lateral deflection of the tire.

DETAILED DESCRIPTION

Figure 1:
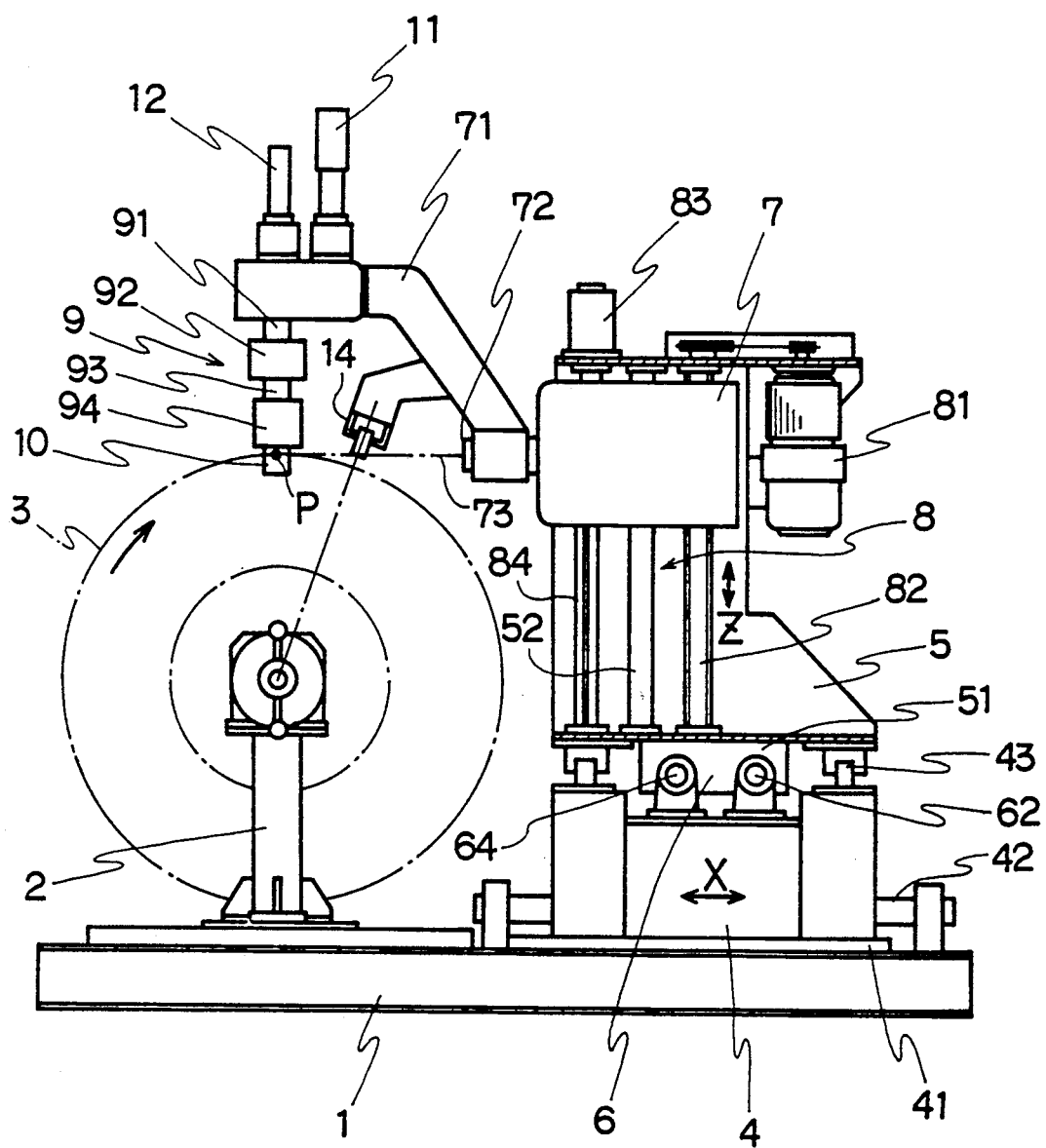
FIG. 1 is a side view showing a first embodiment of a grooving apparatus to which the apparatus of the present invention is applied.

Hereinafter, the method and the apparatus of the present invention are explained in detail based on the drawings. However the present invention is not limited to the embodiments illustrated in the drawings.

Figure 2:
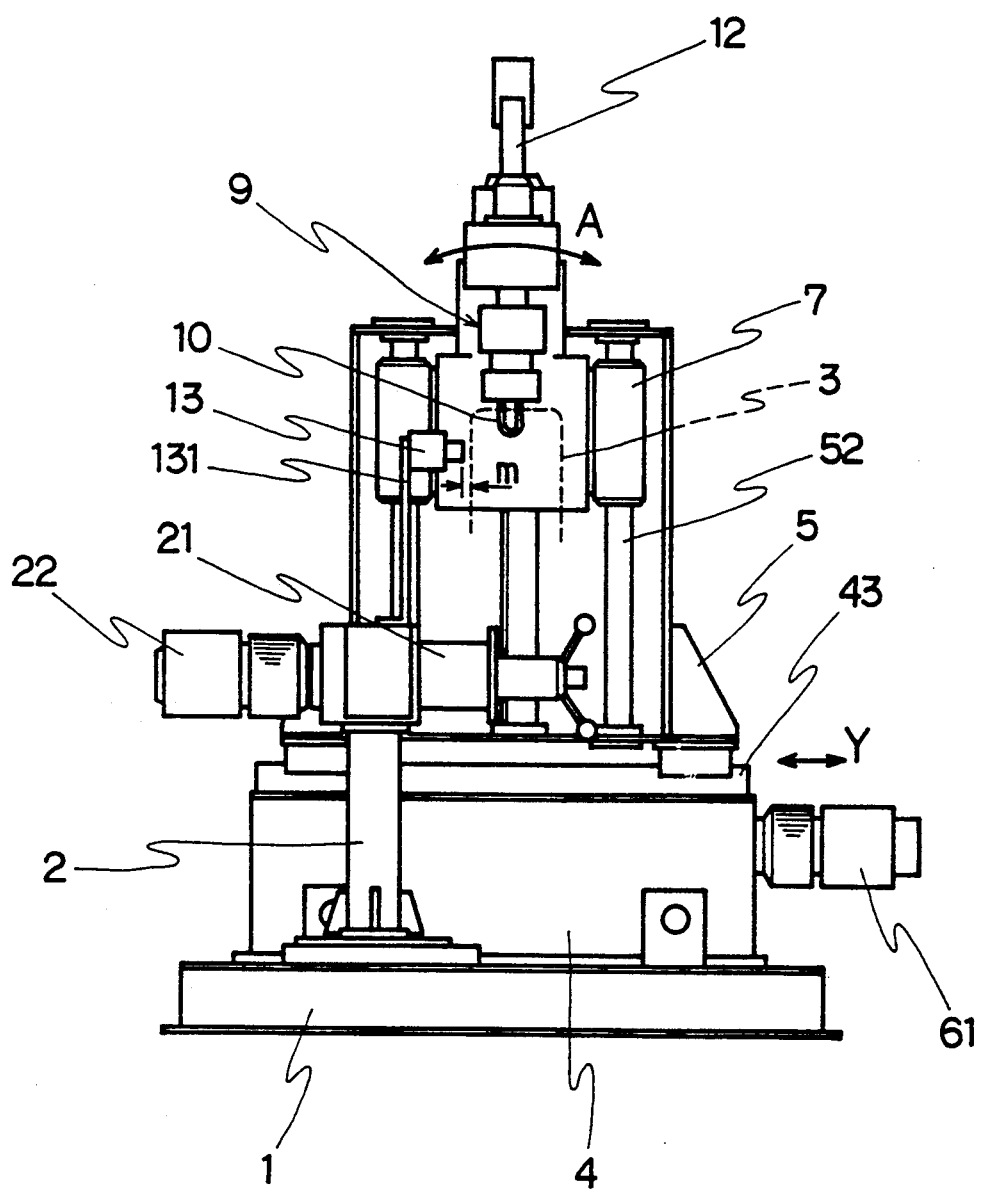
FIG. 2 is a front view showing the first embodiment.

FIG. 1 and FIG. 2 show the first embodiment of a grooving apparatus to which the apparatus of the present invention is applied.

In the grooving apparatus shown in FIG. 1 and FIG. 2, the numeral 1 indicates a bed, the numeral 2 indicates a tire support provided on the bed 1 and a tire 3 is mounted to a tire supporting shaft 21 and is rotated by a motor 22. The numeral 4 indicates a base which is received by a rail 41 on the bed 1 and allowed to move being driven by a motor which is not shown in the drawings along a guide bar 42 in the direction of X-axis perpendicularly to the central axis of the tire support 2. Alternatively, the base 4 can be fixed if the distance between the base 4 and the tire support 2 is set at a prespecified distance.

The numeral 5 indicates a laterally travelling stage which is placed on the base 4 and is allowed to move along a rail 43 in the direction of Y-axis in numeral 6 indicates a laterally driving device for the laterally travelling stage 5. The laterally driving device 6 employs a construction, as clearly shown in FIG. 3 particularly, wherein a laterally driving shaft 62, which is rotated by a driving motor 61 and comprises a feed screw, and a laterally correction shaft 64, which comprises a spline shaft rotated by a correction motor 63, are mounted in parallel with each other on the base 4 in the direction of Y-axis parallel to the tire supporting shaft 21. And a supporting boss 66 and a female threaded body 65 comprising a ball screw are attached to a frame 51 provided on the under side surface of the laterally travelling stage 5, and the female threaded body 65 is engaged with a threaded part of the laterally driving shaft 62 while the supporting boss 66 is passed through by the laterally correction shaft 64 in such a manner that the supporting boss 66 is rotated together with the laterally correction shaft 64 but the supporting boss 66 is allowed to move freely in the axial direction. The numeral 67 indicates a driving gear which is integratedly fixed to the supporting boss 66, the numeral 68 indicates a driven gear which is loosely passed through by the laterally driving shaft 62 and is fixed to the female threaded body 65, and the driving gear 67 and the driven gear 68 are engaged with each other. The numeral 69 is a supporting bearing located on the base 4. The female threaded body 65 is rotatably supported by the frame 51, and the frame 51 is slidably supported by a pair of rails 43.

Figure 4:
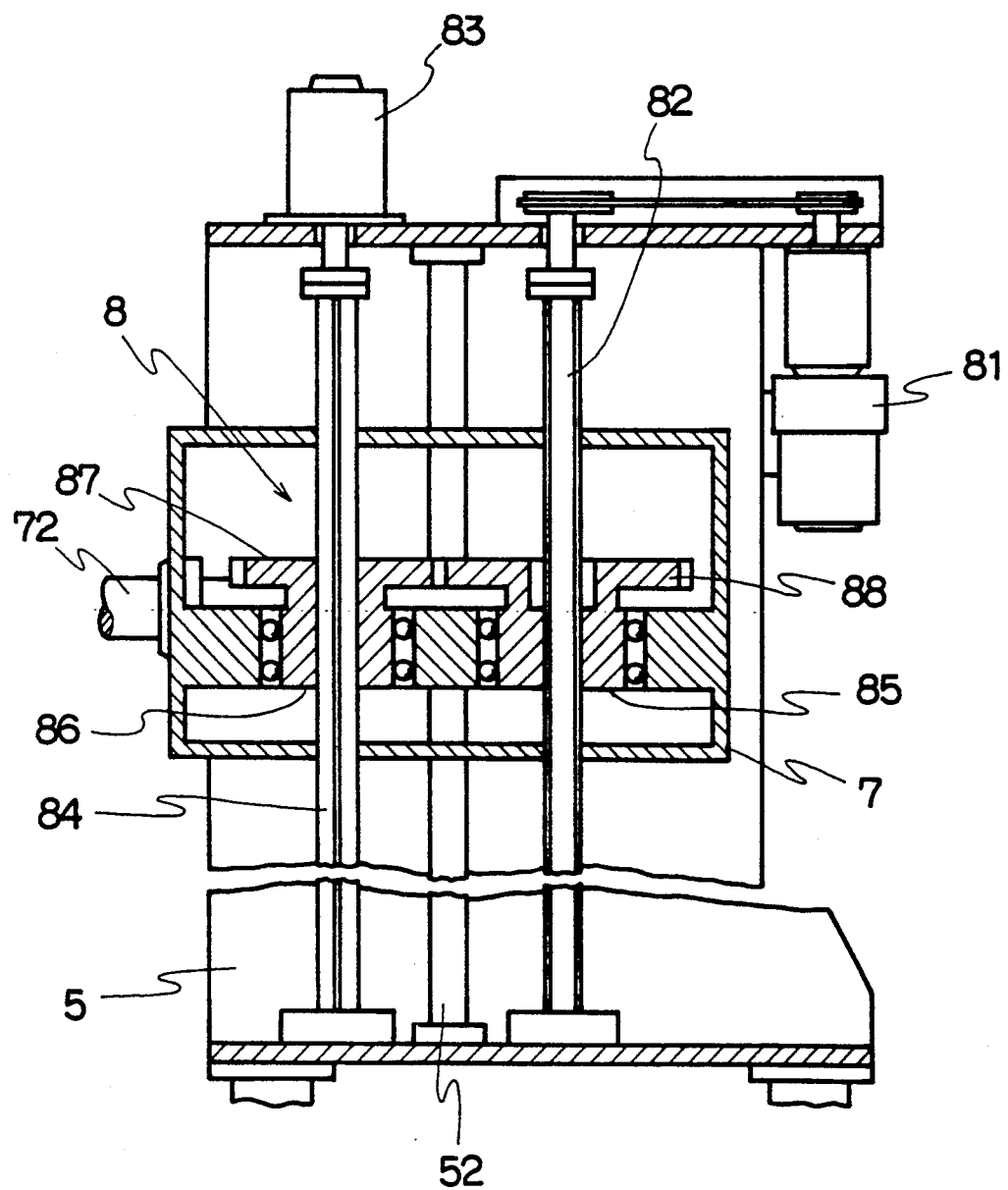
FIG. 4 is a side sectional view of a radially driving device.

The numeral 7 indicates a radially travelling stage which is received by the laterally travelling stage 5 and allowed to move along a guide shaft 52 in the direction of Z-axis perpendicularly to the tire supporting shaft 21 and the numeral 8 indicates a radially driving device for the radially travelling stage 7. The radially driving device 8 employs a construction similar to the construction of the aforementioned laterally driving device 6, as shown in FIG. 4 in detail, wherein a radially driving shaft 82, which is supported in vertical posture by the laterally travelling stage 5 and comprises a feed screw rotatable by a driving motor 81, and a radially correction shaft 84, which is rotated by a correction motor 83 and comprises a spline shaft, are mounted in parallel with each other on the laterally travelling stage 5. And a female threaded body 85 and a supporting boss 86 are provided rotatably on the radially travelling stage 7, and the female threaded body 85 is engaged with the radially driving shaft 82 while the supporting boss 86 is passed through by the radially correction shaft 84 in such a manner that the supporting boss 86 is rotated together with the radially correction shaft 84 but the supporting boss 86 is allowed to move freely in the axial direction. The numeral 87 indicates a driving gear which is rotated together with the radially correction shaft 84 and fixed to the supporting boss 86, the numeral 88 indicates a driven gear which is loosely passed through by the radially driving shaft 82 and integratedly fixed to the female threaded body 85, and the driving gear 87 and the driven gear 88 are engaged with each other.

The numeral 71 indicates a rotating arm which is attached to an arm supporting shaft 72 projecting in the direction of X-axis from the radially travelling stage 7 and is rotated around a central axis 73 of the arm supporting shaft 72 in the direction of the arrow A shown in FIG. 2 by a motor which is not shown in the drawing.

The numeral 9 indicates a cutter supporting unit attached in such a manner that the cutter supporting unit 9 projects perpendicularly toward the central axis 73 from the rotating arm 71. The cutter supporting unit 9 employs a construction wherein a cutter supporting frame 92 is attached to a supporting rod 91 supported by the rotating arm 71, a cutter holder 94 is attached to the cutter supporting frame 92 with an insulating member 93 being disposed therebetween, a cutter 10 is removably attached to the cutter holder 94 in such a manner that a cutting point P is located on the extended line from the central axis 73, and the cutter 10 is heated up by an electric power supply unit which is not shown in the drawing. The numeral 11 indicates a motor which rotates the cutter supporting unit 9 to change the direction of the cutter 10. The numeral 12 indicates an actuator which provide up-down movement of the cutter supporting unit 9 to make the cutting point P of the cutter 10 positioned on the central axis 73.

Alternatively, there can be employed a construction, instead of the above construction having the actuator 12, wherein the position of the cutter supporting unit 9 attached to the supporting rod 91 is adjusted so that the cutting point P is positioned on the central axis 73.

The numeral 13 indicates a lateral deflection detector which is faced to the buttress of the tire side surface keeping an adequate distance m and detects a lateral deflection of the tire. As the lateral deflection detector 13, there can be used, for example, a reflex type optical displacement sensor of which the position can be adjusted in accordance with the tire diameter by means of a supporting unit 131 attached to the tire support 2. The detected value therefrom is given to a control unit not shown in the drawing as an input so as to drive the correction motor 63 of the laterally driving device 6.

The numeral 14 indicates a radial deflection detector which detects a radial deflection of the tread surface of the tire 3. As the radial deflection detector 14, there can be used, for example, a reflex type optical displacement sensor which is attached to the rotating arm 7 or to the cutter supporting frame 92 in such a manner that light is emitted to the tire tread surface in the direction toward the tire center. The detected value therefrom is given to a control unit not shown in the drawing as an input so as to drive the correction motor 83 of the radially driving device 8.

Figure 5:
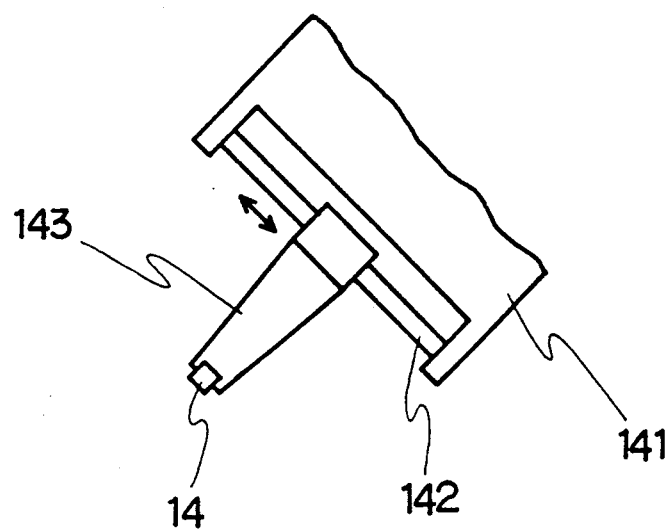
FIG. 5 is a partially side view showing an example of a mounting device for the radial deflection detector.

FIG. 5 shows an example of a mounting device for the radial deflection detector, in which a guide rod 142 is supported in parallel with the tire tread surface by a bracket 141 to be attached to the rotating arm 71, a supporting plate 143 is attached slidably along the guide rod 142, and a reflex type optical displacement sensor 14 is attached to the end of the supporting plate 143. When the cutter supporting unit is moved upward or downward by means of the radially travelling stage 7 in accordance with the tire size, the supporting plate 143 is slid along the guide rod 142 so that the light from the sensor 14 is emitted in the direction toward the tire center.

Figure 6:
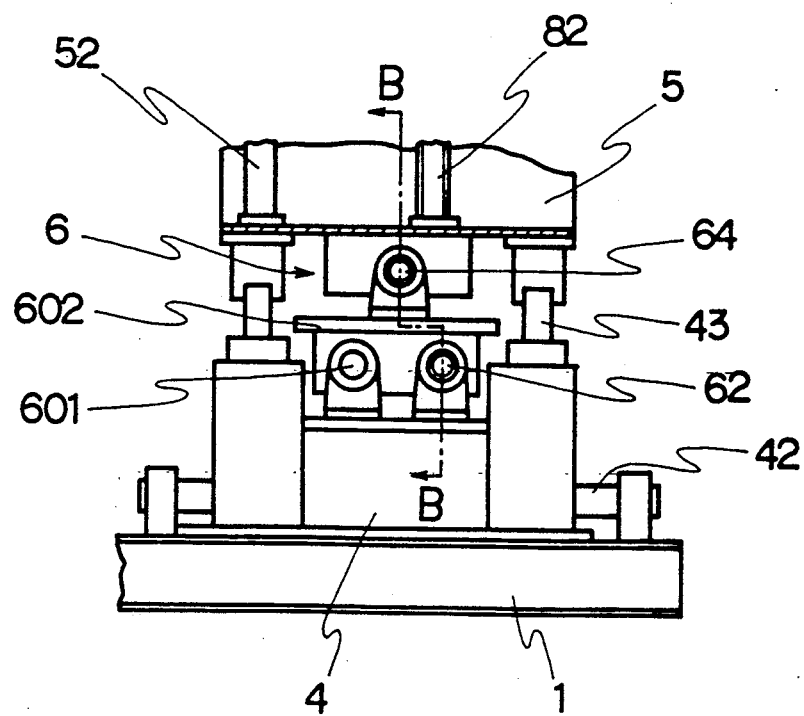
FIG. 6 is a side view showing another example of a laterally driving device.
Figure 7:
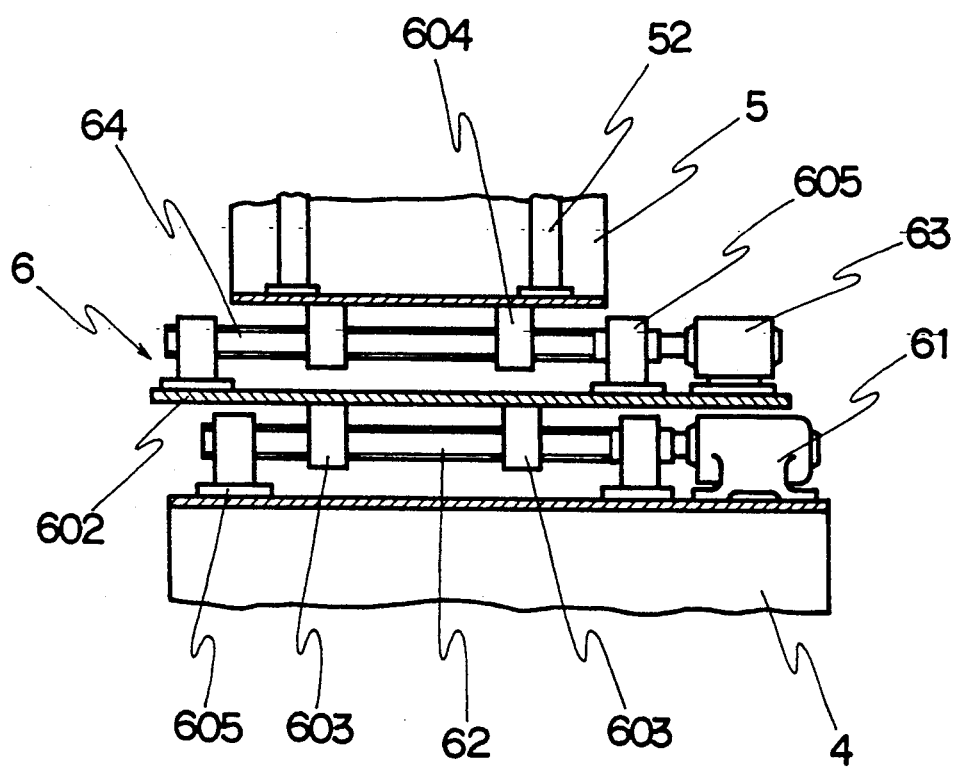
FIG. 7 is a sectional view taken along the line (B)—(B) in FIG. 6.

FIG. 6 and FIG. 7 show another example of the laterally driving device 6 for driving the laterally travelling stage 5, wherein a laterally driving shaft 62, which is rotated by a driving motor 61 and comprises a feed screw, is mounted on the base 4, and an intermediate supporting stage 602, which is supported by the laterally driving shaft 62 and a guide rod 601, is moved by the rotation of the laterally driving shaft 62 with the assistance of a female threaded body 603. A correction motor 63 and a laterally correction shaft 64 comprising a feed screw are mounted on the intermediate supporting stage 602, and a female threaded body 604, which is attached to a laterally travelling stage 5 received by a rail 43, is engaged with the laterally correction shaft 64. In addition, the numeral 605 indicates a bearing. Alternatively, there can be employed a construction wherein the location of the laterally driving shaft 62 are exchanged for the location of the laterally correction shaft 64.

Figure 8:
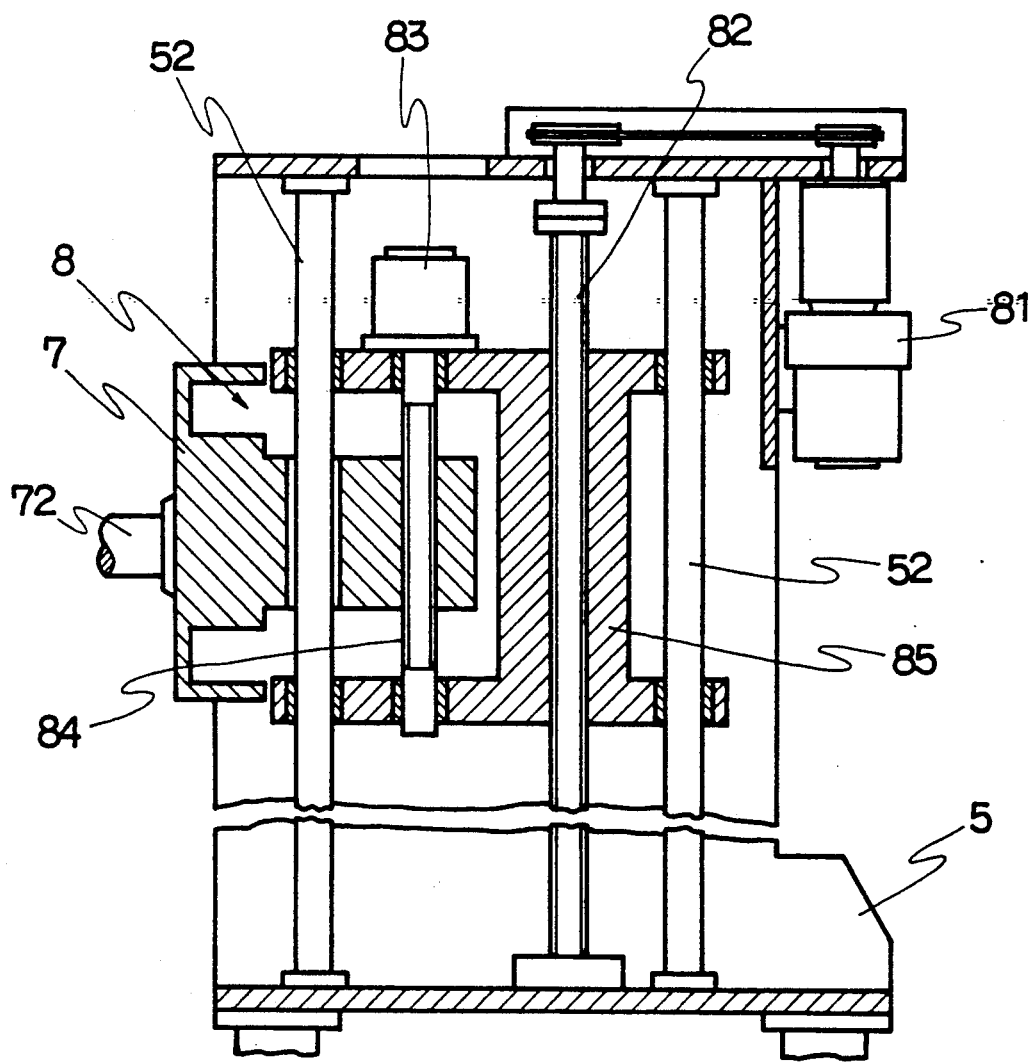
FIG. 8 is a side view showing another example of a radially driving device.

FIG. 8 shows another example of the radially driving device 8, wherein a radially driving shaft 82, which is rotated by a driving motor 81 and comprises a feed screw, is engaged with a female threaded body 85, which is supported by a guide shaft 52, and a radially correction shaft 84, which comprises a feed screw disposed in parallel with the radially driving shaft 82, and a correction motor 83 are attached to the female threaded body 85, further a radially travelling stage 7 is engaged with the radially correction shaft 84.

The laterally travelling stage 5 and the female threaded body 604 in FIG. 7 may be integratedly formed, and the intermediate supporting stage 602 and the female threaded body 603 in FIG. 7 also may be integratedly formed. Similarly, the radially travelling stage 7 in FIG. 8 may be regarded as a combination of a radially travelling stage and a female threaded body, and the female threaded body 85 in FIG. 8 may be regarded as a combination of an intermediate supporting stage and a female threaded body.

Since one of the distinguished features of the present invention is the structure wherein the reference movement (controlled by the main program based on a desired grooving pattern) and the correction movement (controlled by the correction program based on detected deflection values) are mechanically superposed, there can be employed, instead of the mechanisms of FIGS. 6 to 8, an alternative arrangement in which each travelling stage is moved by each driving shaft and each structure supporting each driving shaft is moved by each correcting shaft.

Although the above grooving apparatus explained as the first embodiment employs a construction wherein a cutter is located above a tire and is moved in up-down direction, it is a matter of course that the present invention can be applied to another type of apparatus wherein a cutter is located in front of or behind a tire and is moved in a horizontal direction perpendicularly to a tire supporting shaft.

As a motor used in the apparatus, there can be used an electric servo motor or a fluid servo motor, and particularly the correction motor can be a motor having a small capacity and can be operated at a low speed because the correction motor only have to provide a small correction of the cutter position.

In addition, the radial deflection detector and the lateral deflection detector are not limited to the reflect type optical displacement sensors but there can be used a contact type differential transformer or a digital type dial gauge. Further, lateral deflection sensors 13 may be provided on either side of the tire to correct the cutter position based on the detected values on both sides.

Figure 19:
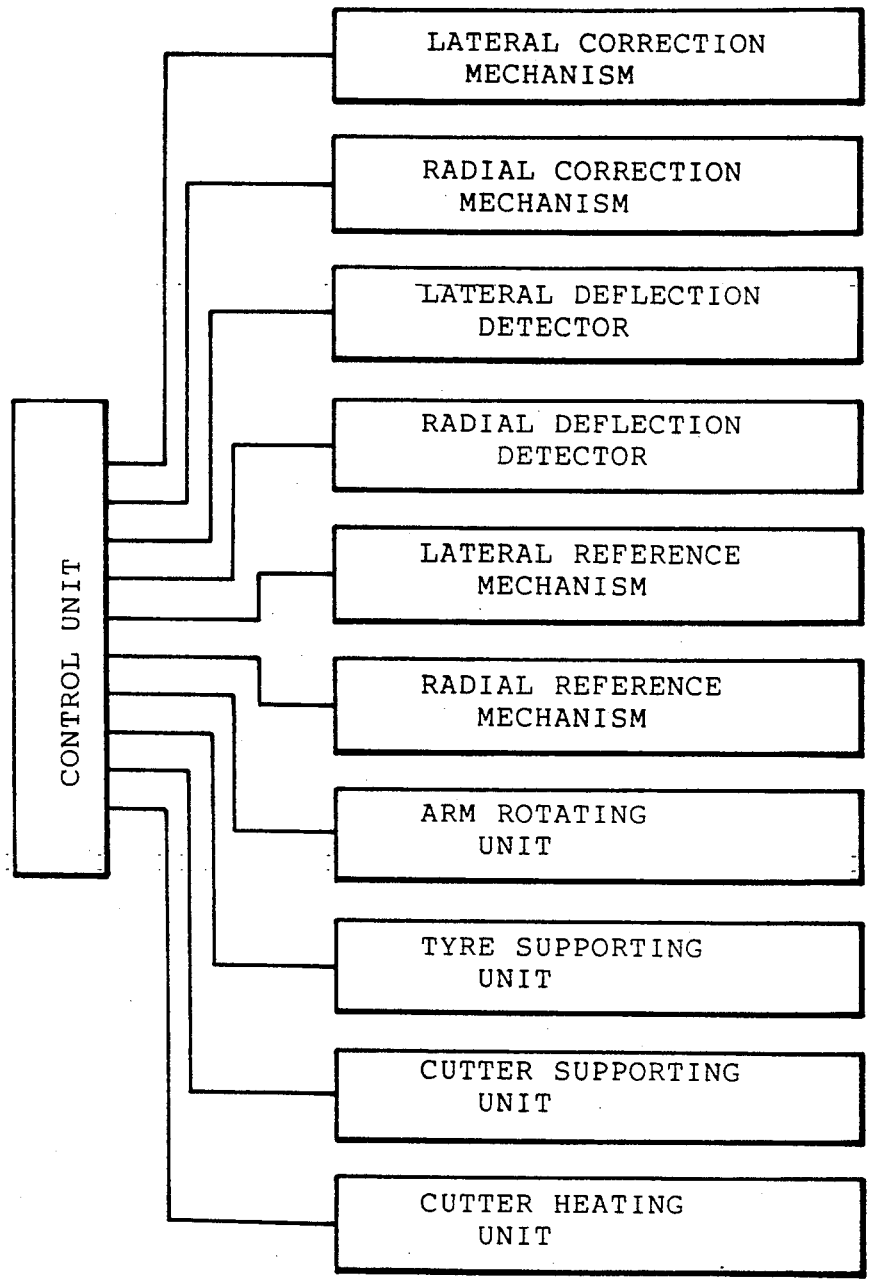
FIG. 19 is a block diagram showing the major functions of the first embodiment.

FIG. 19 shows the cutter heating unit (not shown in FIG. 1 or FIG. 2), the cutter supporting unit (the numeral 9 in FIG. 1), the tire supporting unit (the numerals 2 and 21 in FIG. 2), the arm rotating unit (the numerals 71 and 72 in FIG. 1), the radial reference mechanism (including radially driving shaft) and the lateral reference mechanism (including laterally driving shaft) are connected to the control unit, and further the radial deflection detector, the lateral deflection detector, the radial correction mechanism (including radial correction shaft) and the lateral correction mechanism (including lateral correction shaft) are also connected to the control unit.

Figure 20:
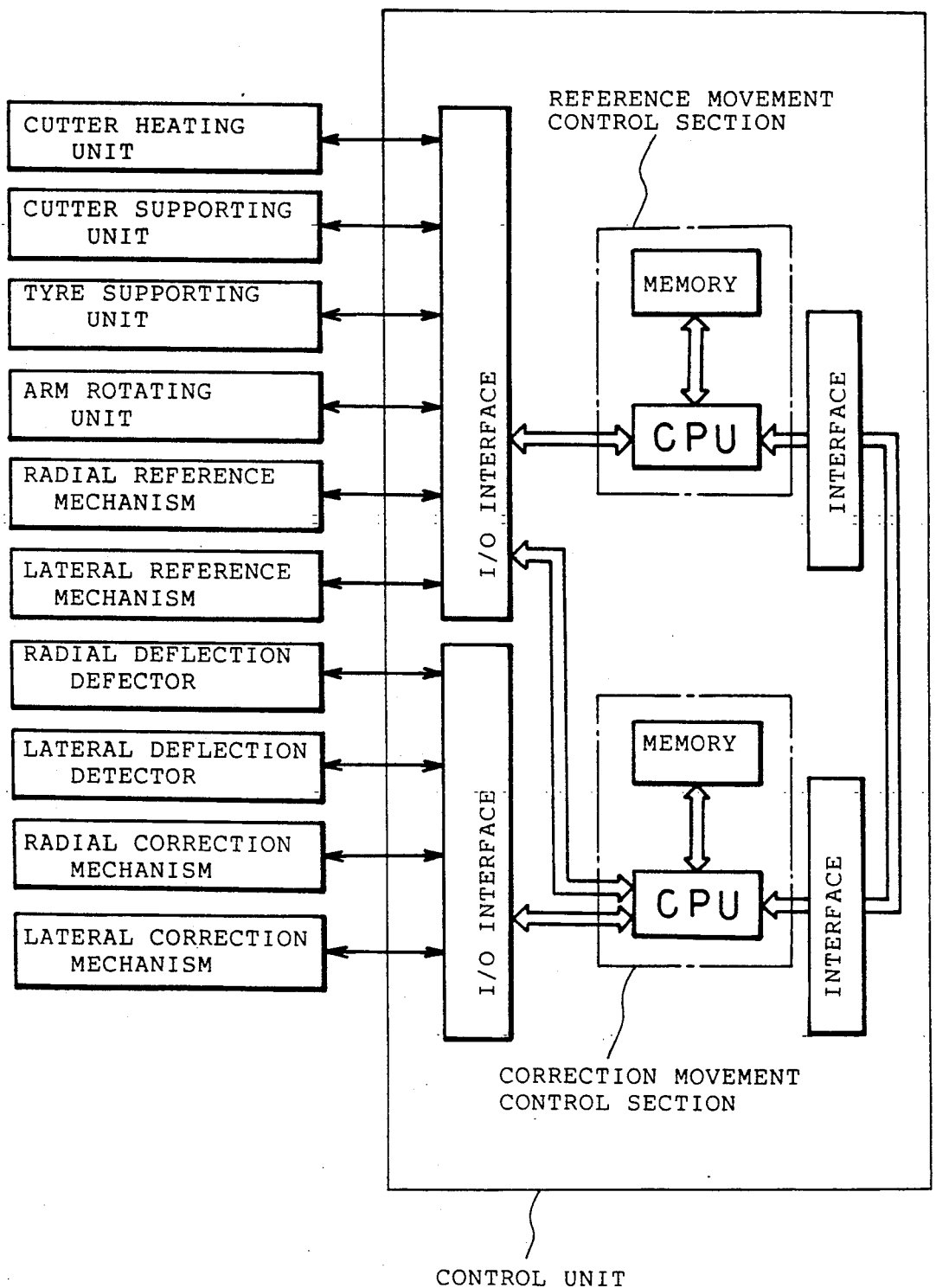
FIG. 20 is an electrical block diagram showing the major control system of the first embodiment.
Figure 21:
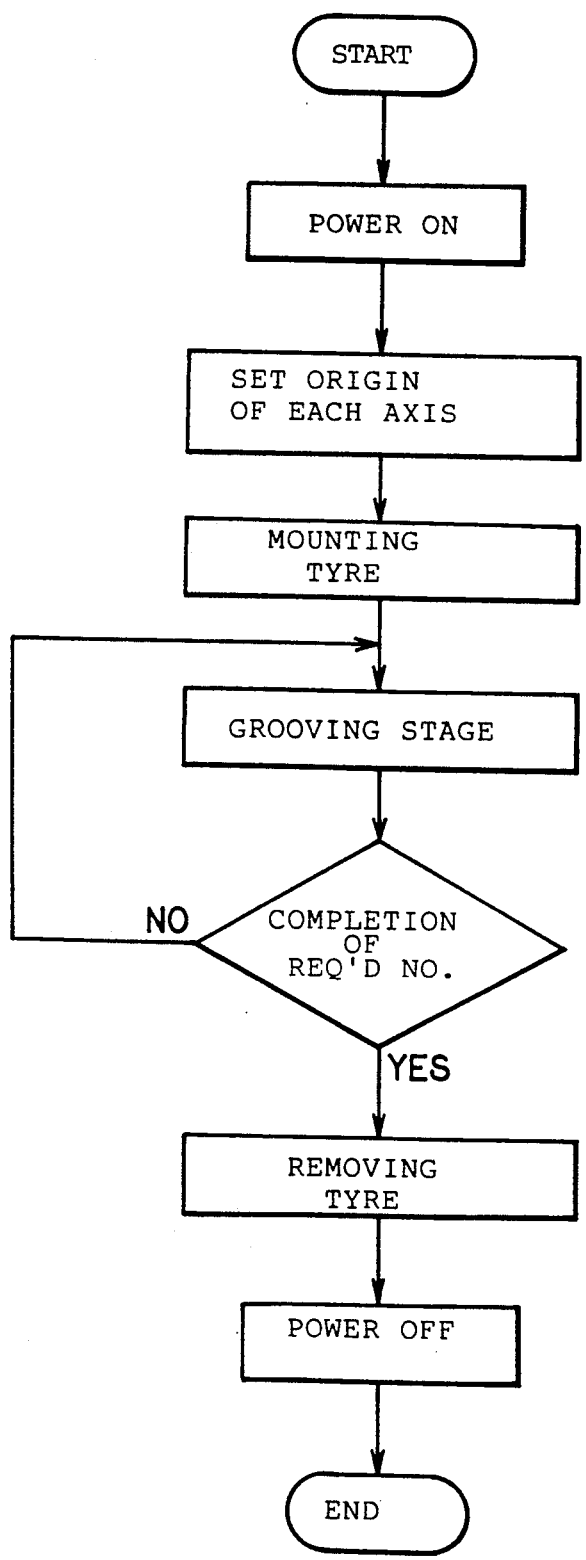
FIG. 21 is a flow chart showing still another example of the grooving operating using the apparatus of the first embodiment.

FIG. 20 shows one typical structure of the control unit having the reference movement control section, the correction movement control section and necessary interfaces. The main program is stored in the memory of the reference movement control section and controls the cutter movement along a non-deflected path in accordance with a prespecified grooving pattern, while the correction program is stored in the memory of the correction movement control section and corrects the cutter movement in accordance with the detected deflections.

The radial reference mechanism is a means for providing the cutter radial reference movement in accordance with the output of the main program and the radial correction mechanism is a means for providing the cutter radial correction movement in accordance with the output of the correction program. In FIG. 4, the driving motor 81, the radially driving shaft 82 and the female threaded body 85 correspond to the radial reference mechanism, while the correction motor 83, the radially correction shaft 84 and the supporting boss 86 with the driving gear 87 correspond to the radial correction mechanism. In FIG. 8, the driving motor 81, the radially driving shaft 82 and the female threaded body 85 correspond to the radial reference mechanism, while the correction motor 83, the radially correction shaft 84 and the radially travelling stage 7 correspond to the radial correction mechanism.

Figure 3:
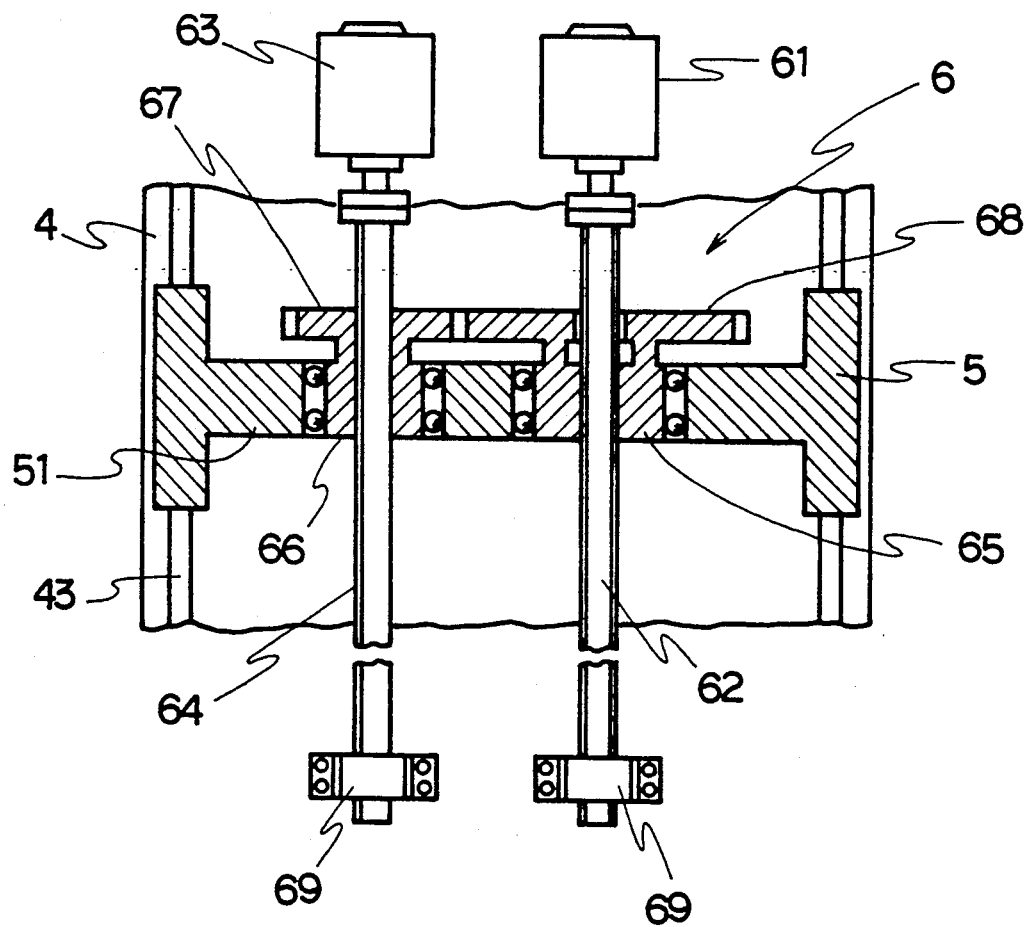
FIG. 3 is a plan view showing a section of a laterally driving device.

The lateral reference mechanism is a means for providing the cutter lateral reference moment in accordance with the output of the main program and the lateral correction mechanism is a means for providing the cutter lateral correction movement in accordance with the output of the correction program. In FIG. 3, the driving motor 61, the laterally driving shaft 62 and the female threaded body 65 correspond to the lateral reference mechanism, while the correction motor 63, the laterally correction shaft 64 and the supporting boss 66 with the driving gear 67 correspond to the lateral correction mechanism. In FIGS. 6 and 7, the driving motor 61, the laterally driving shaft 62 and the female threaded bodies 603 correspond to the lateral reference mechanism, while the correction motor 63, the laterally correcting shaft 64 and the female threaded bodies 604 correspond to the lateral correction mechanism.

The radial reference mechanism, the radial correction mechanism, the lateral reference mechanism and the lateral correction mechanism may include other supporting, guiding or connecting members indicated in those figures.

With regard to FIGS. 19 to 20, it will be readily understood that in case of an apparatus capable of only radial deflection compensation, the lateral deflection detector and the lateral correction mechanism will not be provided, and that in case of an apparatus capable of only lateral deflection compensation, the radial deflection detector and the radial correction mechanism will not be provided.

Figure 11:
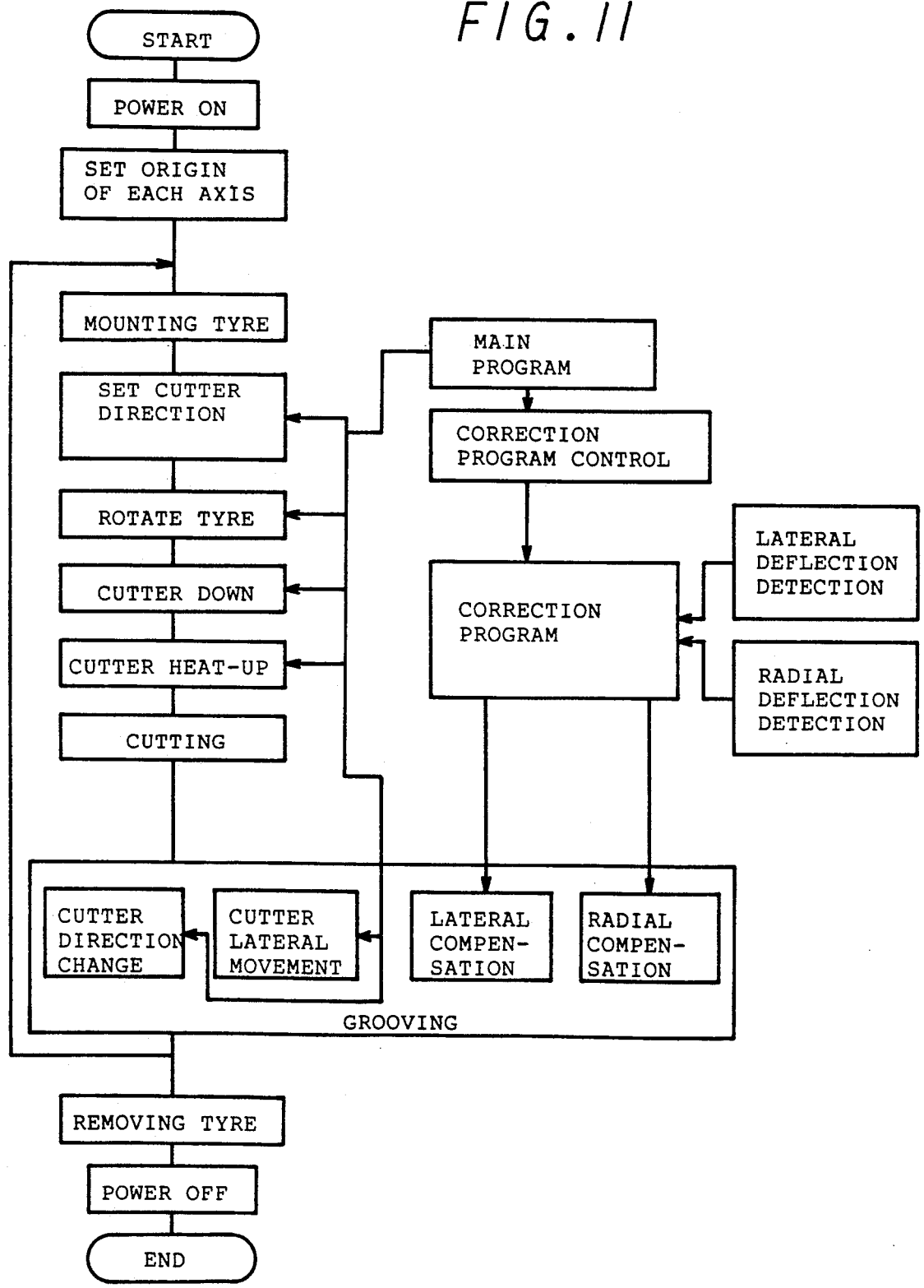
FIG. 11 is a flowchart showing an example of the grooving operation using the apparatus of the first embodiment.

Referring to FIG. 11, there is explained hereinafter an operation for correcting a cutter position using the apparatus of the first embodiment, in which a deflection of a tire is detected and the detected deflection data is collected to be incorporated into calculation.

When operating power is supplied, a position of an origin of each operating shaft is specified based on a command from a computer, which is not shown in the drawings, appropriately for a selected grooving pattern.

A tire 3, onto which a patterned groove is formed, is mounted on the tire supporting shaft 21, and the lateral deflection detector 13 and the radial deflection detector 14 are set so as to be faced respectively to the tire buttress side surface and to the tire tread where grooving operation is performed.

Control values for a tire without deflections have been given to a reference program of the computer as an input and the direction of the cutter 10 is set by the motor 11 so as to agree with the cutting direction in accordance with the reference program. The tire 3 is rotated in the direction of the arrow (FIG. 1) by the motor 22, and concurrently the driving motor 81 of the radially driving device 8 for the radially travelling stage 7 is operated, then the radially travelling stage 7 is moved downwardly along the direction of Z-axis by the rotational movement of the radially driving shaft 82 with the assistance of the female threaded body 85, so that the cutter 10 which has been heated up by electric power supply cuts in the tire 3.

Figure 9:
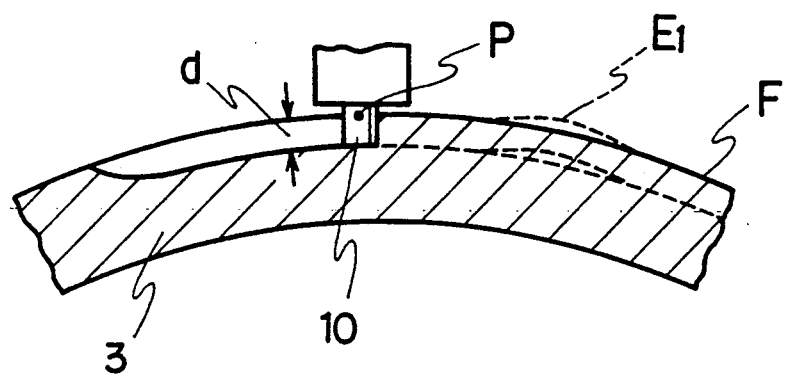
FIG. 9 is an explanatory view showing a sight of the grooving operation.

When the cutter 10 cuts in the tire 3 from a reference tread surface F to a prespecified depth d as shown in FIG. 9 under the control of the reference program, the driving motor 61 of the laterally driving device 6 is moved in accordance with a prespecified groove shape under the control of the reference program, and thus the lateral movement of the cutter 10 is controlled by the movement of the laterally travelling stage 5 in the direction of Y-axis by the rotational movement of the laterally driving shaft 62, so that the prespecified grooving is carried out.

In the course of the above operation, if there is a radial deflection E1 as shown by a dotted line in FIG. 9 due to a distortion of the tread surface of the tire 3, the radial deflection E1 is detected by the radial deflection detector 14. Then the correction motor 83 of the radially driving device 8 for the radially travelling stage 7 is operated in accordance with the correction value from a correction program based on the detected deflection value, and thus, in case of the example shown in FIG. 4, the driving gear 87 is rotated through the radially correction shaft 84 to rotate the female threaded body 85 together with the driven gear 88. The device is designed so that the female threaded body 85 moves upwardly on the radially driving shaft 82 when being rotated in such a manner as described above. Accordingly the radially travelling stage 7 is moved upwardly in the Z-direction and therefore the cutter 10 is moved upwardly so that the cutter position is corrected and the depth d is kept constantly.

On the other hand, in the example of the radially driving device shown in FIG. 8, the rotation of the correction motor 83 rotates the radially correction shaft 84 and thereby the radially travelling stage 7 is moved upwardly.

Figure 10:
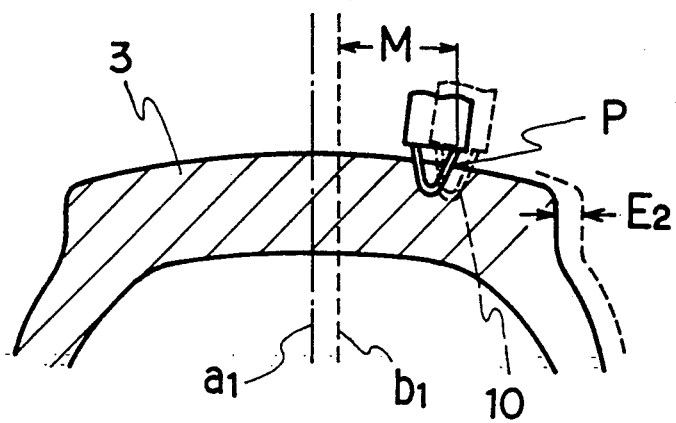
FIG. 10 is an explanatory view showing a sight of the compensating operation for lateral deflection of a tire.

If a tire has a lateral deflection E2 and the tread center is deviated from a position a1 to a position b1 as shown in FIG. 10, the lateral deflection E2 is detected by the lateral deflection detector 13. Then the correction motor 63 of the laterally driving device 6 is controlled by the correction program based on the detected deflection value, and thus, in case of the example of the laterally driving device shown in FIG. 3, the female threaded body 65 is rotated by the laterally correction shaft 64 with the assistance of the driving gear 67 and the driven gear 68, so that the cutter position is corrected to a position shown by a dotted line in FIG. 10 by the lateral movement in the direction of Y-axis of the laterally travelling stage 5. Accordingly a distance M from the tire center to the groove position is kept constantly.

On the other hand, in the laterally driving device shown in FIG. 6 and FIG. 7, the laterally correction shaft 64 is rotated by the rotation of the correction motor 63, and thus the laterally travelling stage 5 is moved with the assistance of the female threaded body 604.

Thus, during the grooving operation, the cutting point P of the cutter is constantly controlled in agreement with the tread surface and also the cutter position is adjusted according to the lateral deflection E2 of the tire, and therefore the position of the groove relative to the tire center is kept constantly along the entire periphery of the tire.

Figure 12:
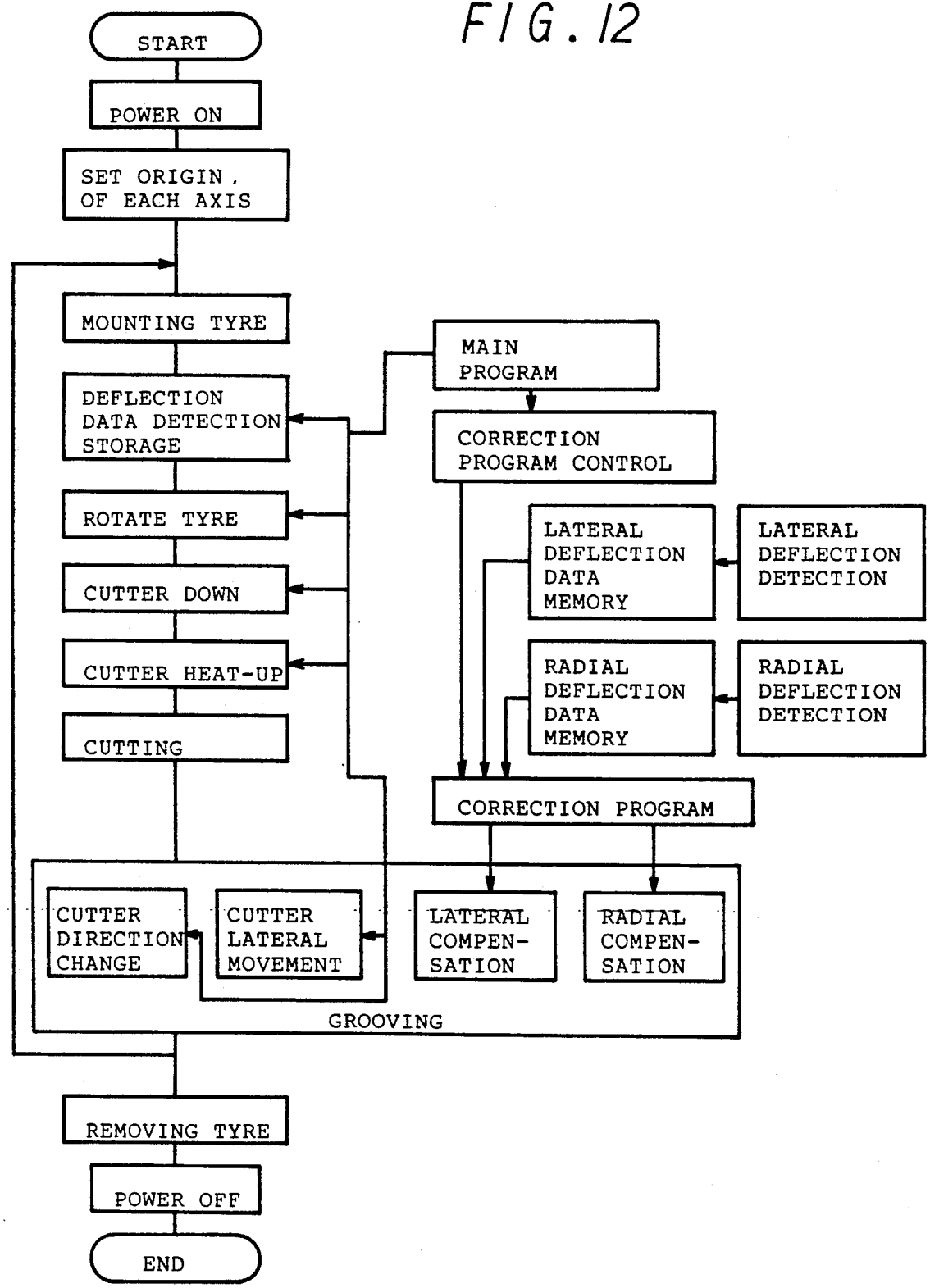
FIG. 12 is a flowchart showing another example of the grooving operation using the apparatus of the first embodiment.

Referring to a flowchart shown in FIG. 12, there is explained an example of operation using the grooving apparatus of the first embodiment, wherein a tire is rotated prior to the grooving operation and the deflections of the tire at any rotational positions are detected and stored in advance, and the stored deflection data is read out in the grooving operation to be used for calculation so that the correction of the cutter position is carried out.

First, power is supplied and an origin of each operating shaft is specified based on a command from a computer which is not shown in the drawings. A tire 3, onto which a patterned groove is formed, is mounted on the tire supporting shaft 21, and an origin mark is provided by marking on the tread surface at a position in agreement with a particular wear indicator. The radial deflection sensor 14 is arranged so as to be faced to the tire tread where grooving operation is performed, and the lateral deflection sensor 13 is arranged so as to be faced to the tire buttress.

The tire 3 is rotated at a low speed and the origin mark is brought in agreement with the radial deflection sensor 14 to set an origin for a numerical control. Starting from this condition, the tire 3 is rotated to make one revolution, and during this rotation the detected values by the radial deflection sensor 14 and the lateral deflection sensor 13 are stored in a memory together with corresponding rotational angular positions. The data collected by the radial deflection sensor 14 represents a central position data of the grooves to be formed.

When an automatic operation button is pushed after the deflection data is stored in the memory, the tire supporting shaft 21 is rotated and concurrently the cutter 10 is controlled by a plurality of operating shafts such as a laterally driving shaft, a radially driving shaft, a rotating shaft etc. under the control of the main program of the numerical control device, thereby the movement of a cutter is automatically controlled for tire grooving, and is moved downwardly to be brought into contact with the prespecified position of the tire. Meanwhile the cutter has been heated up, and a prespecified grooving operation is carried out according to the rotational angular position with respect to the origin with a prespecified locus being formed.

The stored radial deflection data is read out from the memory according to the rotational angular position of the tire, and the correction value from the correction program is calculated in accordance with a correction program control command from the main program. Thus, the radially correction shaft 84 is rotated by the correction motor 83 of the radially driving device 8 based on the radial deflection correction value, and thus the movement caused by the correction program is added to (or substracted from) the movement caused by the main program for the radial movement of the cutter 10.

The stored lateral deflection data is read out from the memory according to the rotational angular position on the periphery of the buttress, and the correction motor 63 of the laterally driving device 6 is operated based on the lateral deflection correction value calculated by the correction program. Thus, the laterally correction shaft 64 is rotated and the movement caused by the correction program is added to (or subtracted from) the movement caused by the reference program for the lateral movement of the cutter 10.

Further, there can be employed a construction wherein the execution of the lateral correction and the execution of the radial correction provided by the correction program are individually controlled (e.g. in on-off manner) by the reference program, so that either or both executions can be cancelled independently when such correction is not required.

As explained hereinbefore, the first embodiment of the apparatus for compensating deflection of the present invention employs a construction wherein the apparatus comprises the laterally driving shaft to move the cutter in parallel with the tire supporting shaft, the radially driving shaft to move the cutter perpendicularly to the tire supporting shaft and the detector to detect the lateral deflection and the radial deflection of the tire, and the laterally driving shaft and the radially driving shaft are controlled by the standard movement (or the reference movement), and concurrently the cutter movement is corrected by superposing the correction movement according to the detected value of the detector on the standard movement. Therefore, the groove depths and the groove positions of tires can be kept constant even if there are radial deflections and/or lateral deflections in the tire.

Further, since the reference movement is always controlled based on the prespecified value by the reference program and the correction movement based on the detected deflection value can be superposed on the standard movement by the separate correction program, the structure of the program can be simplified and the apparatus can be made smaller, and the correction is performed surely.

Moreover, since both the radial deflection and the lateral deflection are compensated, the groove depth and the groove position with respect to the tire center can be always kept constant and the uniform grooving can be achieved.

Figure 13:
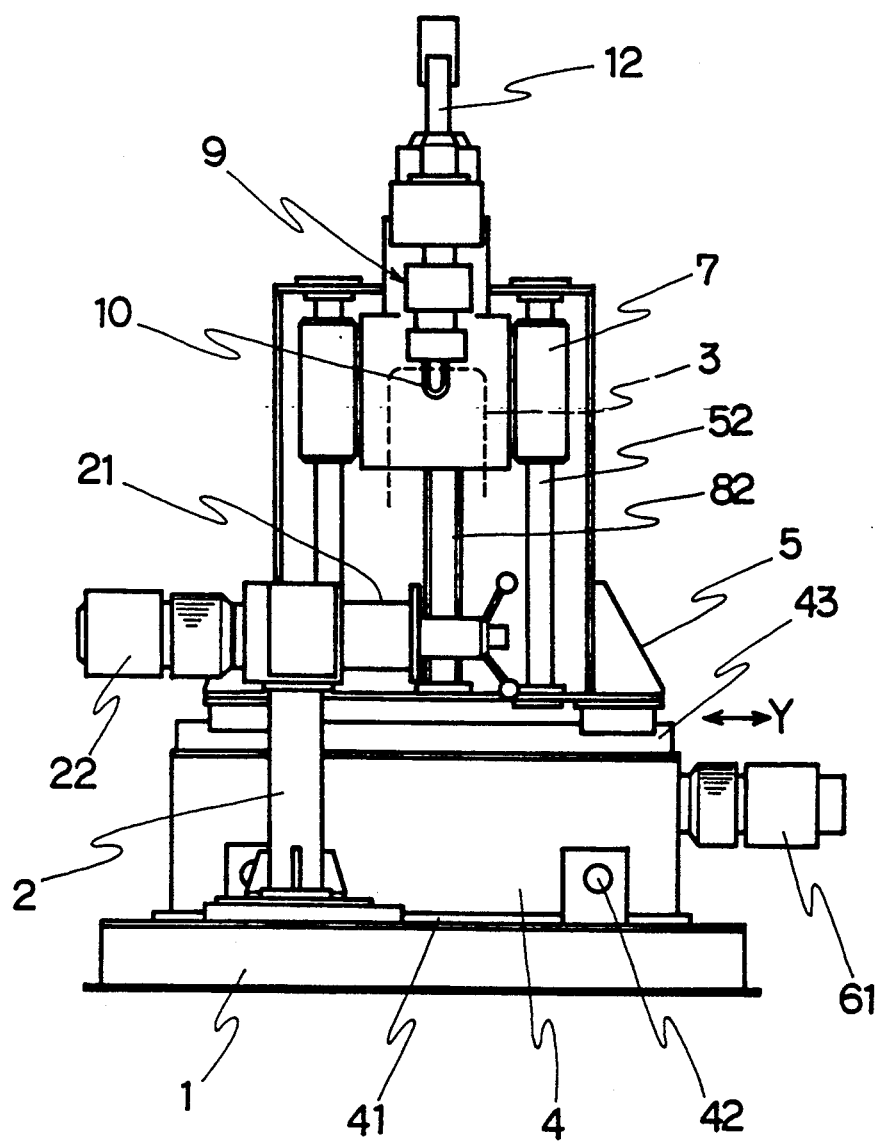
FIG. 13 is a front view showing a second embodiment of a grooving apparatus to which the apparatus of the present invention is applied.

There is explained next the second embodiment of the present invention in which only the radial deflection compensation is achieved FIG. 13 is a front view of the apparatus of the second embodiment. A side view of the second embodiment is omitted because it is same as the side view of the first embodiment (FIG. 1) excepting that the laterally correction shaft 64 shown in FIG. 1 is not employed in the second embodiment.

FIG. 13 shows the second embodiment of a grooving apparatus to which the apparatus of the present invention is applied.

In the grooving apparatus shown in FIG. 13, the numeral 1 indicates a bed, the numeral 2 indicates a tire support provided on the bed 1 and a tire 3 is mounted to a tire supporting shaft 21 and is rotated by a motor 22. The numeral 4 indicates a base which is received by a rail 41 on the bed 1 and allowed to move being driven by a motor which is not shown in the drawings along a guide bar 42 in the direction of X-axis perpendicularly to the central axis of the tire support 2. Alternatively, the base 4 can be fixed if the distance between the base 4 and the tire support 2 is set at a prespecified distance.

The numeral 5 indicates a laterally travelling stage which is placed on the base 4 and is allowed to move along a rail 43 in the direction of Y-axis in parallel with the tire supporting shaft 21 and a laterally driving device for the laterally travelling stage 5 is provided thereunder. The laterally driving device employs a construction, wherein a laterally driving shaft, which is rotated by a driving motor 61 and comprises a feed screw, and a guide bar are mounted in parallel with each other on the base 4 in the direction of Y-axis parallel to the tire supporting shaft 21. And a female threaded body comprising a ball screw is attached to a frame provided on the under side surface of the laterally travelling stage 5, and the female threaded body is engaged with a threaded part of the laterally driving shaft.

The numeral 7 indicates a radially travelling stage which is received by the laterally travelling stage 5 and allowed to move along a guide shaft 52 in the direction of Z-axis perpendicularly to the tire supporting shaft 21 and a radially driving device for the radially travelling stage 7 having the same construction as that shown in FIG. 1 and FIG. 4 is provided.

The numeral 9 indicates a cutter supporting unit having the same construction as that shown in FIG. 1 and the numeral 12 indicates an actuator which provide up-down movement of the cutter supporting unit 9 to make the cutting position P of the cutter 10 be positioned on the central axis 73.

Similarly to the first embodiment, there can be employed an alternative construction, instead of the above construction having the actuator 12, wherein the position of the cutter supporting unit 9 attached to the supporting rod 91 shown in FIG. 1 is adjusted so that the cutting point P is positioned on the central axis 73.

Also in the apparatus of the second embodiment, there is employed the same radial deflection detector as that shown in FIG. 1.

With regard to a mounting device for the radial deflection detector, the same device as that used in the first embodiment can be used.

With respect to the radially driving device, the device shown in FIG. 8 can be employed instead of the device shown in FIG. 4 as previously mentioned.

Although the above grooving apparatus explained as the second embodiment employs a construction wherein a cutter is located above a tire and is moved in up-down direction, it is a matter of course that the present invention can be applied to another type of apparatus wherein a cutter is located in front of or behind a tire and is moved in a horizontal direction perpendicularly to a tire supporting shaft.

As a motor used in the apparatus, there can be used an electric servo motor or a fluid servo motor, and particularly the correction motor can be a motor having a small capacity and can be operated at a low speed because the correction motor only have to provide a small correction of the cutter position.

In addition, the radial deflection detector and the lateral deflection detector are not limited to the reflect type optical displacement sensors but there can be used a contact type differential transformer or a digital type dial gauge.

Figure 14:
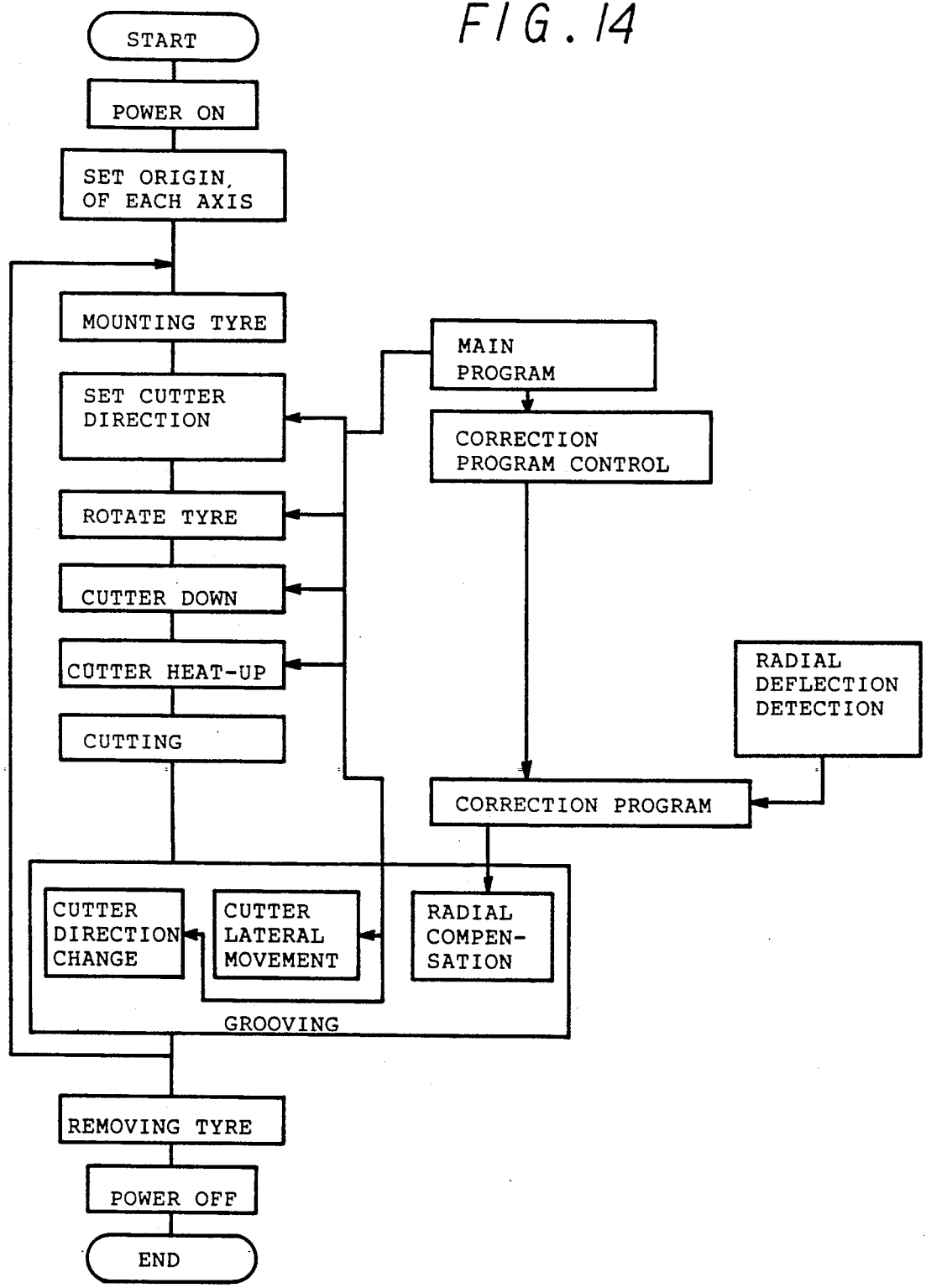
FIG. 14 is a flowchart showing an example of the grooving operation using the apparatus of the second embodiment.

Referring to FIG. 14, there is explained hereinafter an operation for correcting a cutter position using the apparatus of the second embodiment, in which a deflection of a tire is detected and the detected deflection data is collected to be incorporated into calculation.

When operating power is supplied, a position of an origin of each operating shaft is specified based on a command from a computer, which is not shown in the drawings, appropriately for a selected grooving pattern.

A tire 3, onto which a patterned groove is formed, is mounted on the tire supporting shaft 21, and the radial deflection detector sensor 14 is set so as to be faced to the tire tread where grooving operation is performed.

Control value for a tire without deflections has been given to a reference program of the computer as an input and the direction of the cutter 10 is set by a motor and the like so as to agree with the cutting direction in accordance with the reference program. The tire 3 is rotated by the motor 22, and concurrently the driving motor of the radially driving device for the radially travelling stage 7 is operated, then the radially travelling stage 7 is moved downwardly along the direction of Z-axis by the rotational movement of the radially driving shaft 82 with the assistance of the female threaded body, so that the cutter 10 which has been heated up by electric power supply cuts in the tire 3.

The cutter 10 cuts in the tire 3 from a standard tread surface F to a prespecified depth d as shown in FIG. 9 under the control of the standard program. In case that the groove shape to be formed is not straight, the driving motor of the laterally driving device is moved in accordance with a prespecified groove shape under the control of the reference program, and thus the lateral movement of the cutter 10 is controlled by the movement of the laterally travelling stage 5 in the direction of Y-axis driven by the rotational movement of the laterally driving shaft, so that the prespecified grooving is carried out.

In the course of the above operation, if there is a radial deflection E1 as shown by a dotted line in FIG. 9 due to a distortion of the tread surface of the tire 3, the radial deflection E1 is detected by the radial deflection detector Then the correction motor of the radially driving device for the radially travelling stage 7 is operated in accordance with the correction value from a correction program based on the detected deflection value, and thus, in case of the example shown in FIG. 4, the driving gear 87 is rotated through the radially correction shaft 84 to rotate the female threaded body 85 together with the driven gear 88. The device is designed so that the female threaded body 85 moves upwardly on the radially driving shaft 82 when being rotated in such a manner as described above. Accordingly the radially travelling stage 7 is moved upwardly in the Z-direction and therefore the cutter 10 is moved upwardly so that the cutter position is corrected and the depth d is kept constantly.

On the other hand, in the example of the radially driving device shown in FIG. 8, the female threaded body 85 is moved by the radially driving shaft 82 under the control of the reference program, and the rotation of the correction motor 83 rotates the radially correction shaft 84 based on the detected value and thereby the radially travelling stage 7 is moved upwardly.

In such a manner as described above, the radial deflection of the tire is detected during the grooving operation and the position of the radially travelling stage is controlled by the radially driving shaft under the control of the reference program and is adjusted in accordance with the correction program. Thus, the cutting point P of the cutter is controlled in agreement with the tread surface and also the cutter position is adjusted according to the lateral deflection E2 of the tire during the grooving operation, and therefore the cutter depth is kept constantly along the entire periphery of the tire.

Figure 15:
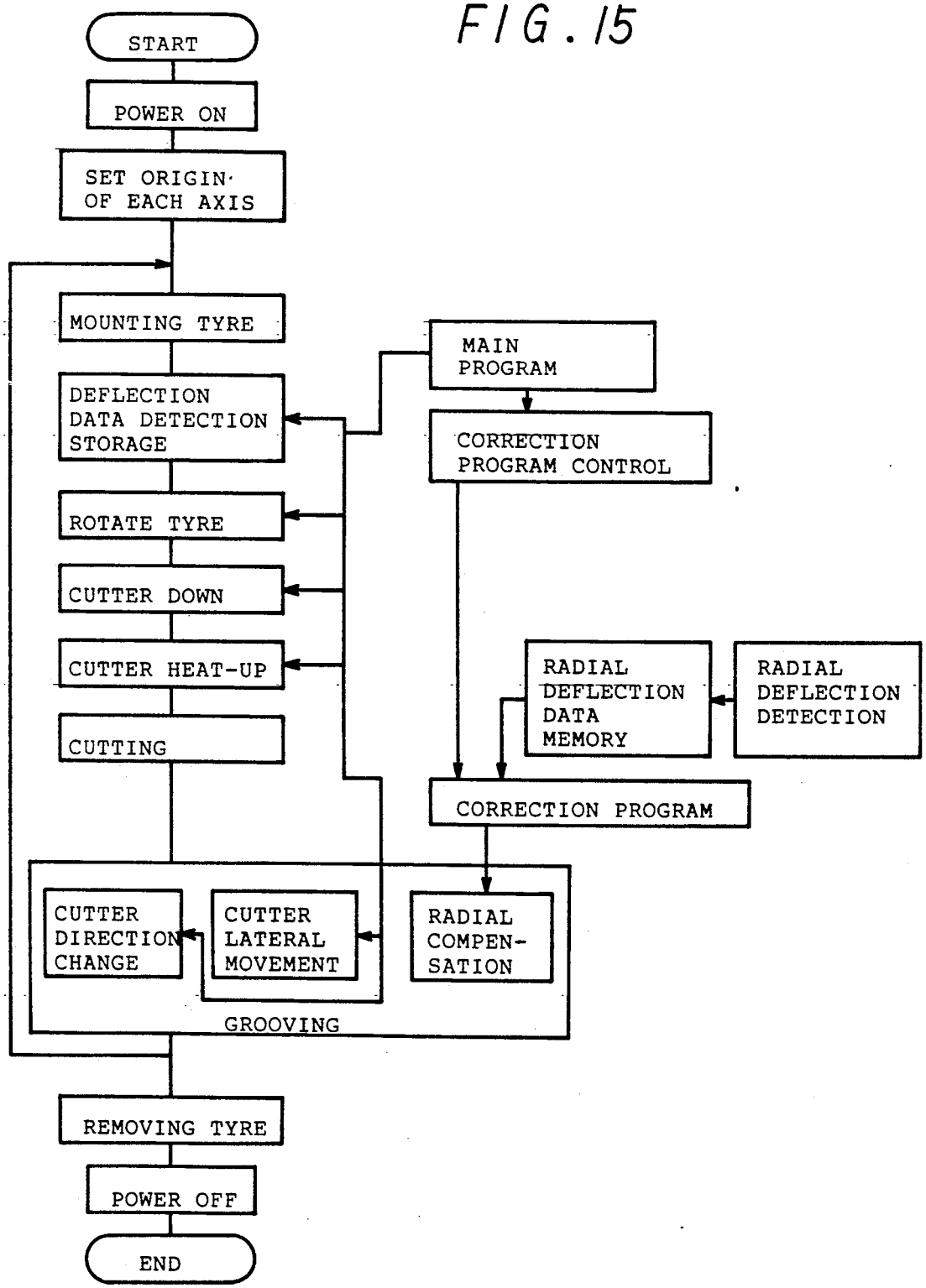
FIG. 15 is a flowchart showing another example of the grooving operation using the apparatus of the second embodiment.

Referring to a flowchart shown in FIG. 15, there is explained another example of operation using the grooving apparatus of the second embodiment, wherein a tire is rotated prior to the grooving operation and the deflections of the tire at any rotational positions are detected and stored in advance, and the stored deflection data is read out in the grooving operation to be used for calculation so that the correction of the cutter position is carried out.

First, power is supplied and an origin of each operating shaft is specified based on a command from a computer which is not shown in the drawings. A tire 3, onto which a patterned groove is formed, is mounted on the tire support 2, and an origin mark is provided by marking on the tread surface at a position in agreement with a particular wear indicator. The radial deflection sensor 14 is arranged so as to be faced to the tire tread where grooving operation is performed.

The tire 3 is rotated at a low speed and the origin mark is brought in agreement with the radial deflection sensor 14 to set an origin for a numerical control. Starting from this condition, the tire 3 is rotated to make one revolution, and during this rotation the detected values by the radial deflection sensor 14 are stored in a memory together with corresponding rotational angular positions. The data collected by the radial deflection sensor 14 represents a central position data of the grooves to be formed.

When an automatic operation button is pushed after the deflection data is stored in the memory, the tire supporting shaft 21 is rotated and concurrently the cutter 10 is controlled by a plurality of operating shafts such as a laterally driving shaft, a radially driving shaft, a rotating shaft etc. under the control of the main program of the numerical control device. Thus the cutter is moved downwardly to be brought into contact with the prespecified position of the tire. Meanwhile the cutter has been heated up, and a prespecified grooving operation is carried out according to the rotational angular position with respect to the rotational angular position with respect to the origin with a prespecified locus being formed.

The stored radial deflection data is picked up from the memory according to the rotational angular position of the tire, and the correction value from the correction program is calculated in accordance with a correction program control command from the reference program.

Thus, the radially correction shaft 84 is rotated by the correction motor 83 of the radially driving device 8 based on the radial deflection correction value, and the movement caused by the correction program is added to (or substrated from) the movement caused by the main program of the cutter 10.

As explained hereinbefore, the second embodiment of the apparatus for compensating deflection of the present invention employs a construction wherein the apparatus comprises the laterally driving shaft to move the cutter in parallel with the tire supporting shaft, the radially driving shaft to move the cutter perpendicularly to the tire supporting shaft and the detector to detect the radial deflection of the tire, and the laterally driving shaft and the radially driving shaft are controlled by the reference movement, and concurrently the cutter movement is corrected by superposing the correction movement according to the detected value of the detector on the standard movement. Therefore, the groove depths of product tires can be dept constant even if there are radial deflections.

Furthermore, since the standard movement is always controlled based on the prespecified value by the main program and the correction movement based on the detected deflection value can be superposed on the standard movement by the separate correction program, the structure of the program can be simplified and the apparatus can be made small. Further, the correction is performed surely and the productivity and yield are improved.

There is explained next the third embodiment of the present invention.

Figure 16:
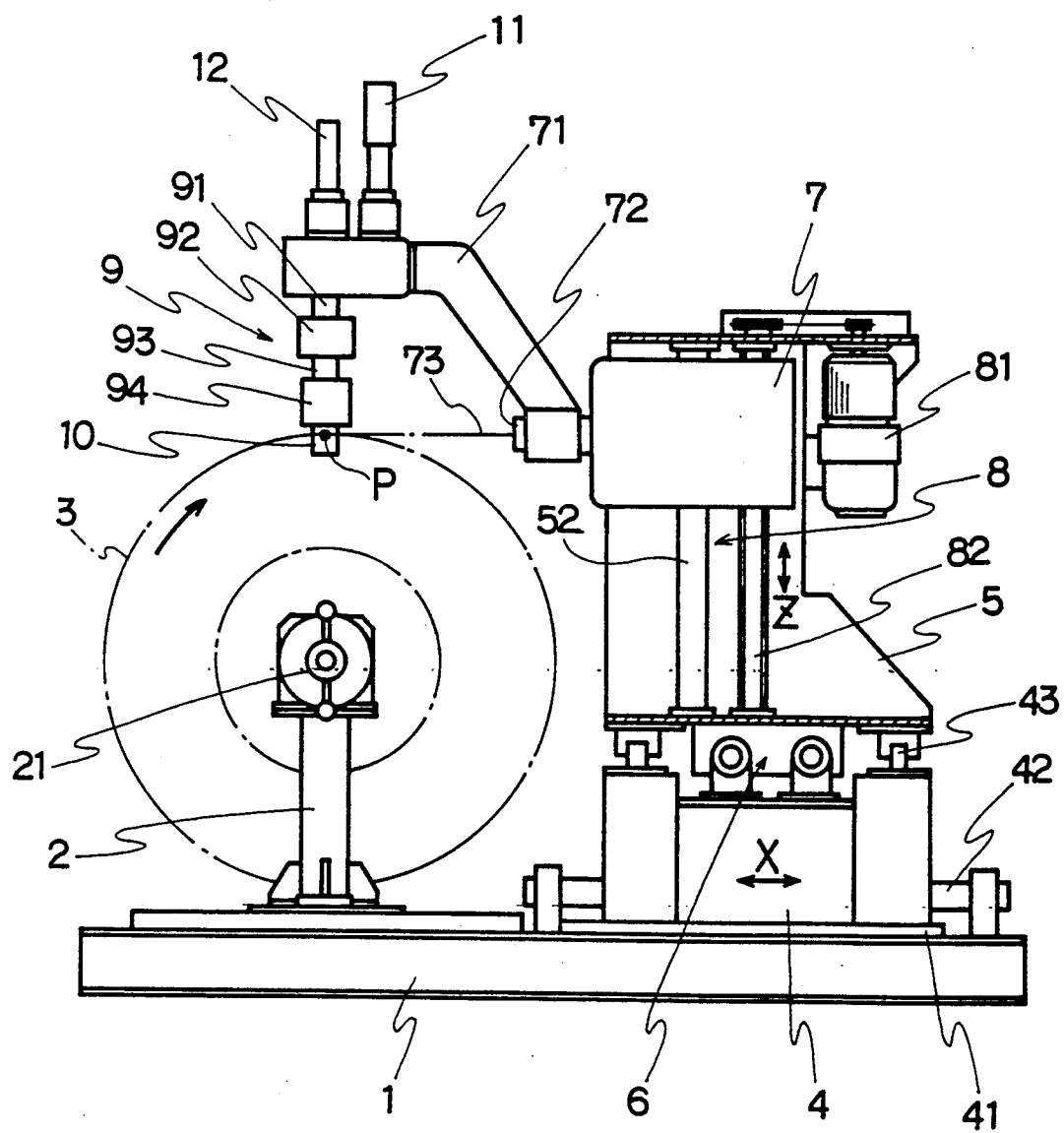
FIG. 16 is a side view showing a third embodiment of a grooving apparatus to which the apparatus of the present invention is applied.

FIG. 16 is a side view of the apparatus of the third embodiment. A front view of the third embodiment is omitted because it is same as the front view of the first embodiment (FIG. 2).

In the grooving apparatus shown in FIG. 16, the numeral 1 indicates a bed, the numeral 2 indicates a tire support provided on the bed 1 and a tire 3 is mounted to a tire supporting shaft 21 and is rotated by a motor. The numeral 4 indicates a base which is received by a rail 41 on the bed 1 and allowed to move being driven by a motor which is not shown in the drawings along a guide bar 42 in the direction of X-axis perpendicularly to the central axis of the tire support 2. Alternatively, the base 4 can be fixed if the distance between the base 4 and the tire support 2 is set at a prespecified distance.

The numeral 5 indicates a laterally travelling stage which is placed on the base 4 and is allowed to move along a rail 43 in the direction of Y-axis in parallel with the tire supporting shaft 21 and the numeral 6 indicates a laterally driving device for the laterally travelling stage 5. The laterally driving device 6 employs the same construction as that shown in FIG. 3.

The numeral 7 indicates a radially travelling stage and the numeral 8 indicates a radially driving device which moves the radially travelling stage 7 in the direction of Z-axis perpendicularly of the tire supporting shaft 21. The radially driving device 8 has a radially driving shaft 82 which is supported in vertical posture by the laterally travelling stage 5 and comprises a feed screw rotated by a driving motor 81, and which moves the radially travelling stage 7 upwardly and downwardly along a guide shaft 52.

The numeral 71 indicates a rotating arm which is attached to an arm supporting shaft 72 projecting in the direction of X-axis from the radially travelling arm supporting shaft 72 in the direction of the arrow A shown in FIG. 2 by a motor which is not shown in the drawing.

The numeral 9 indicates a cutter supporting unit attached in such a manner that the cutter supporting unit 9 projects perpendicularly toward the central axis 73 from the rotating arm 71. The cutter supporting unit 9 employs a construction wherein a cutter supporting frame 92 is attached to a supporting rod 91 supported by the rotating arm 71, a cutter holder 94 is attached to the cutter supporting frame 92 with an insulating member 93 being disposed therebetween, a cutter 10 is removably attached to the cutter holder 94 in such a manner that a cutting point P is located on the extended line from the central axis 73, and the cutter 10 is heated up by an electric power supply unit which is not shown in the drawing. The numeral 11 indicates a motor which rotates the cutter supporting unit 9 to change the direction of the cutter 10. The numeral 12 indicates an actuator which provide up-down movement of the cutter supporting unit 9 to make the cutter 10 positioned on the central axis 73.

Similarly to the first embodiment and the second embodiment, there can be employed an alternative construction, instead of the above construction having the actuator 12, wherein the position of the cutter supporting unit 9 attached to the supporting rod 91 is adjusted so that the cutting point P is positioned on the central axis 73.

Also in the apparatus of the third embodiment, there is employed the same lateral deflection detector as that shown in FIG. 2.

With respect to the laterally driving device, the device shown in FIG. 6 and FIG. 7 can be employed instead of the device shown in FIG. 3.

Although the above grooving apparatus explained as the third embodiment employs a construction wherein a cutter is located above a tire and is moved in up-down direction, it is a matter of course that the present invention can be applied to another type of apparatus wherein a cutter is located in front of or behind a tire and is moved in a horizontal direction perpendicularly to a tire supporting shaft.

As a motor used in the apparatus, there can be used an electric servo motor or a fluid servo motor, and particularly the correction motor can be a motor having a small capacity and can be operated at a low speed because the correction motor only have to provide a small correction of the cutter position.

In addition, lateral deflection sensors 13 may be provided on either side of the tire to correct the cutter position based on the detected values on both sides.

Figure 17:
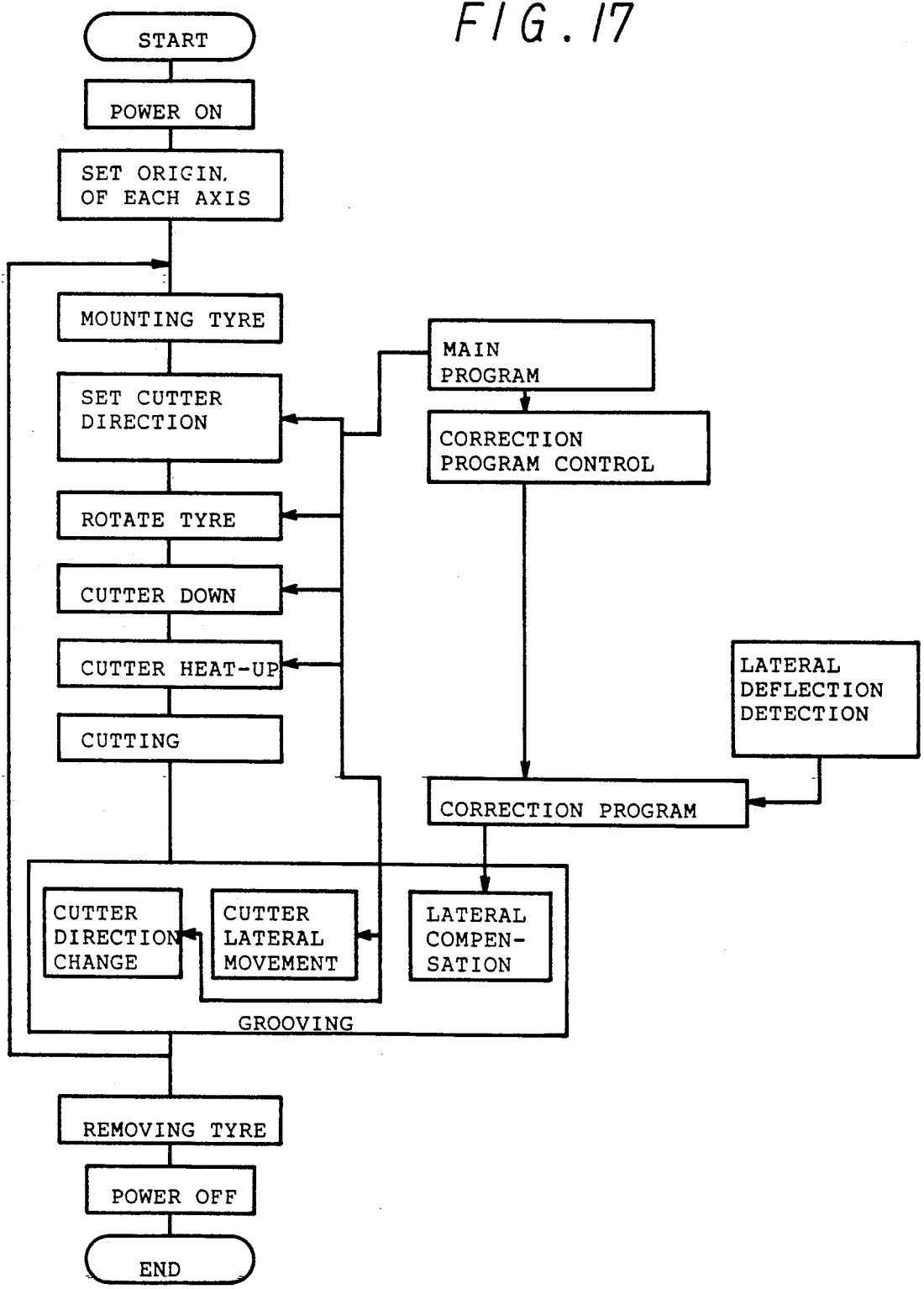
FIG. 17 is a flowchart showing an example of the grooving operation using the apparatus of the third embodiment.

Referring to FIG. 17, there is explained hereinafter an operation for correcting a cutter position using the apparatus of the third embodiment, in which a deflection of a tire is detected during the grooving operation and the detected deflection data is collected to be incorporated into calculation.

When operating power is supplied, a position of an origin of each operating shaft is specified based on a command from a computer, which is not shown in the drawings, appropriately for a selected grooving pattern.

A tire 3, onto which a patterned groove is formed, is mounted on the tire supporting shaft 21, and the lateral deflection detector 13 is set so as to be faced to the tire buttress side surface.

Control values for a tire without deflections have been given to a reference program of the computer as an input and the direction of the cutter 10 is set by the motor 11 so as to agree with the cutting direction in accordance with the reference program. The tire 3 is rotated in the direction of the arrow (FIG. 16) by the motor 22, and concurrently the driving motor 81 of the radially driving device 8 for the radially travelling stage 7 is operated, then the radially travelling stage 7 is moved downwardly along the direction of Z-axis by the rotational movement of the radially driving shaft 82 with the assistance of the female threaded body 85, so that the cutter 10 which has been heated up by electric power supply cuts in the tire 3. The driving motor 61 of the laterally driving device 6 is moved in accordance with a prespecified groove shape under the control of the reference program, and thus the lateral movement of the cutter 10 is controlled by the movement of the laterally travelling stage 5 in the direction of Y-axis driven by the rotational movement of the laterally driving shaft 62, so that the prespecified grooving is carried out.

In the course of the above operation, if a tire has a lateral deflection E2 and the tread center is deviated from a position a1 to a position b1 as shown in FIG. 10, the lateral deflection E2 is detected by the lateral deflection detector 13. Then the correction motor 63 of the laterally driving device 6 is controlled by the correction program based on the detected deflection value, and thus, in case of the example of the laterally driving device, the female threaded body 65 is rotated by the laterally correction shaft 64 with the assistance of the driving gear 67 and the driven gear 68, shown by a dotted line in FIG. 10 by the lateral movement in the direction of Y-axis of the laterally travelling stage 5. Accordingly a distance M from the tire center to the cutter position is kept constantly.

On the other hand, in the laterally driving device shown in FIG. 6 and FIG. 7, the laterally correction shaft 64 is rotated by the rotation of the correction motor 63, and thus the laterally travelling stage 5 is moved with the assistance of the female threaded body 604.

In such a manner as described above, the lateral deflection of the tire is detected and the position of the laterally travelling stage is controlled by the laterally driving shaft under the control of the reference program and is adjusted in accordance with the correction program during the grooving operation. Thus, the cutter position is adjusted according to the lateral deflection E2 of the tire during the grooving operation, and also the cutter position is adjusted according to the lateral deflection E2 of the tire, and therefore the position of the groove relative to the tire center is kept constantly along the entire periphery of the tire.

Figure 18:
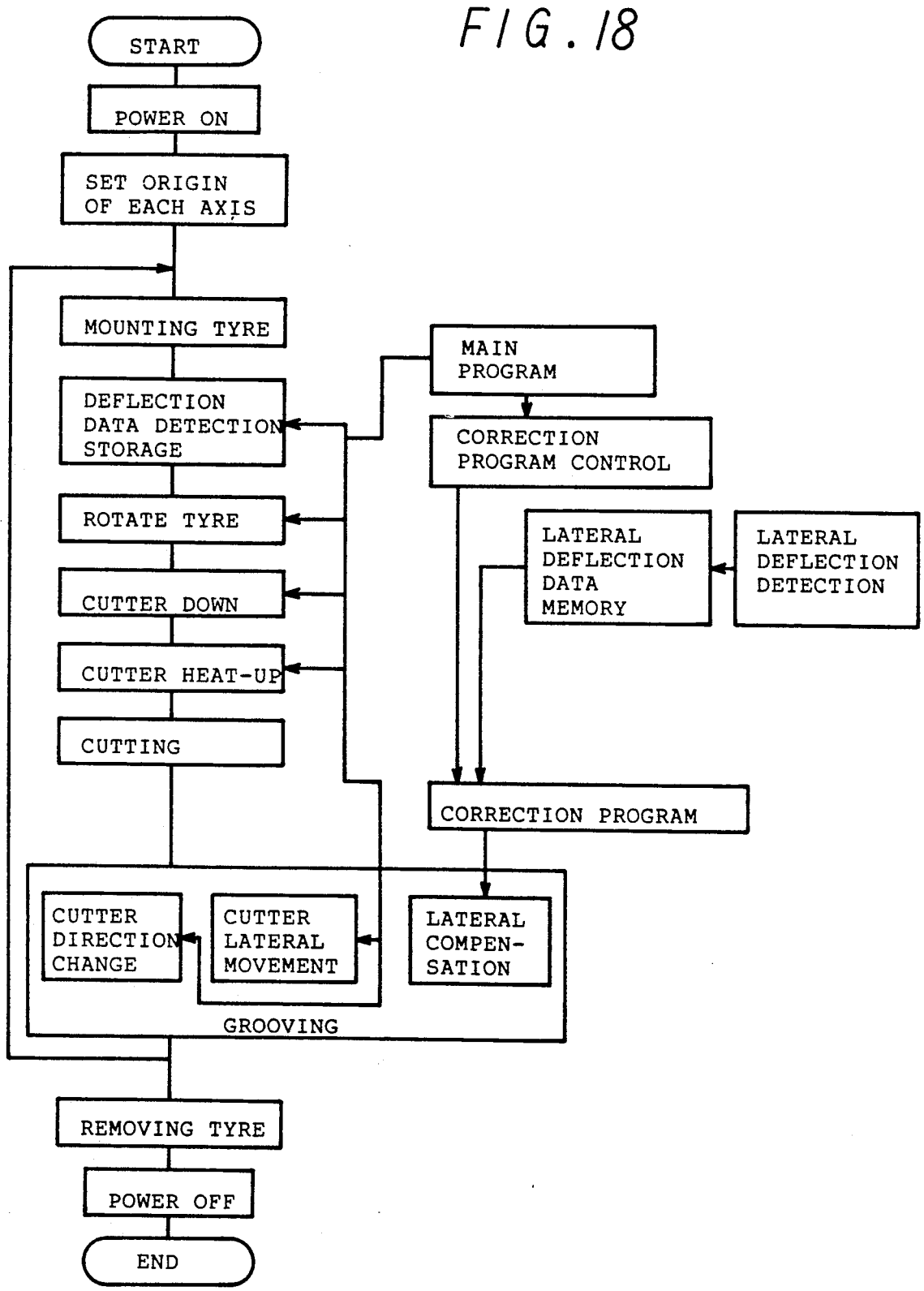
FIG. 18 is a flowchart showing another example of the grooving operation using the apparatus of the third embodiment.

Referring to a flowchart shown in FIG. 18, there is explained another example of operation using the grooving apparatus of the third embodiment, wherein a tire is rotated prior to the grooving operation and the deflections of the tire at any rotational positions are detected and stored in advance, and the stored deflection data is picked up in the grooving operation to be used for calculation so that the correction of the cutter position is carried out.

First, power is supplied and an origin of each operating shaft is specified based on a command from a computer which is not shown in the drawings. A tire 3, onto which a patterned groove is formed, is mounted on the tire support 2, and an origin mark is provided by marking on the tread surface at a position in agreement with a particular wear indicator. The lateral deflection sensor 13 is arranged so as to be faced to the tire buttress.

The tire 3 is rotated at a low speed and an origin for a numeral control is set at the origin mark. Starting from this condition, the tire 3 is rotated to make one revolution, and during this rotation the detected values by the lateral deflection sensor 13 are stored in a memory together with corresponding rotational angular positions.

When an automatic operation button is pushed after the deflection data is stored in the memory, the tire supporting shaft 21 is rotated and concurrently the cutter 10 is controlled by a plurality of operating shafts such as a laterally driving shaft, a radially driving shaft, a rotating shaft etc. under the control of the reference program of the numerical control device. Thus the cutter is moved downwardly to be brought into contact with the prespecified position of the tire. Meanwhile the cutter has been heated up, and a prespecified grooving operating is carried out according to the rotational angular position with respect to the origin with a prespecified locus being formed.

The stored deflection data is picked up from the memory according to the rotational angular position of the tire, and the correction value from the correction program is calculated in accordance with a correction program control command from the reference program. The stored lateral deflection data is picked up from the memory according to the rotational angular position on the periphery of the buttress, and the correction motor 63 of the laterally driving device 6 is operated based on the lateral deflection correction value calculated by the correction program. Thus, the laterally correction shaft 64 is rotated and the movement caused by the correction program is incorporated into the movement caused by the reference program for the lateral movement of the cutter 10.

As explained hereinbefore, the third embodiment of the apparatus for compensating deflection of the present invention employs a construction wherein the apparatus comprises the laterally driving shaft to move the cutter in parallel with the tire supporting shaft, the radially driving shaft to move the cutter perpendicularly to the tire supporting shaft and the detector to detect the lateral deflection of the tire, and the laterally driving shaft and the radially driving shaft are controlled by the reference movement, and concurrently the cutter movement is corrected by superposing the correction movement according to the detected value of the detector on the reference movement. Therefore, the groove positions relative to the respective tire tread centers of tires can be kept constant to provide satisfactory running performance even if there are lateral deflections.

Further, since the reference movement is always controlled based on the prespecified value by the reference program and the correction movement based on the detected deflection value can be superposed on the standard movement by the separate correction program, the structure of the program can be simplified and the apparatus can be made small. Further, the correction is performed surely and the productivity and yield are improved.

FIGS. 21 to 25 show almost similar content to FIGS. 11 to 12 and therefore the previously made explanation for FIGS. 11 to 12 is almost applicable to FIGS. 21 to 25. In the operation shown in FIGS. 21 to 25 as well as in the operation shown in FIGS. 11 to 12, the initial cutter direction setting, the tire rotating and the cutter heating-up are performed under the control of the main program, and the cutting-in of the heated-up cutter is initiated also under the control of the main progress.

Figure 22:
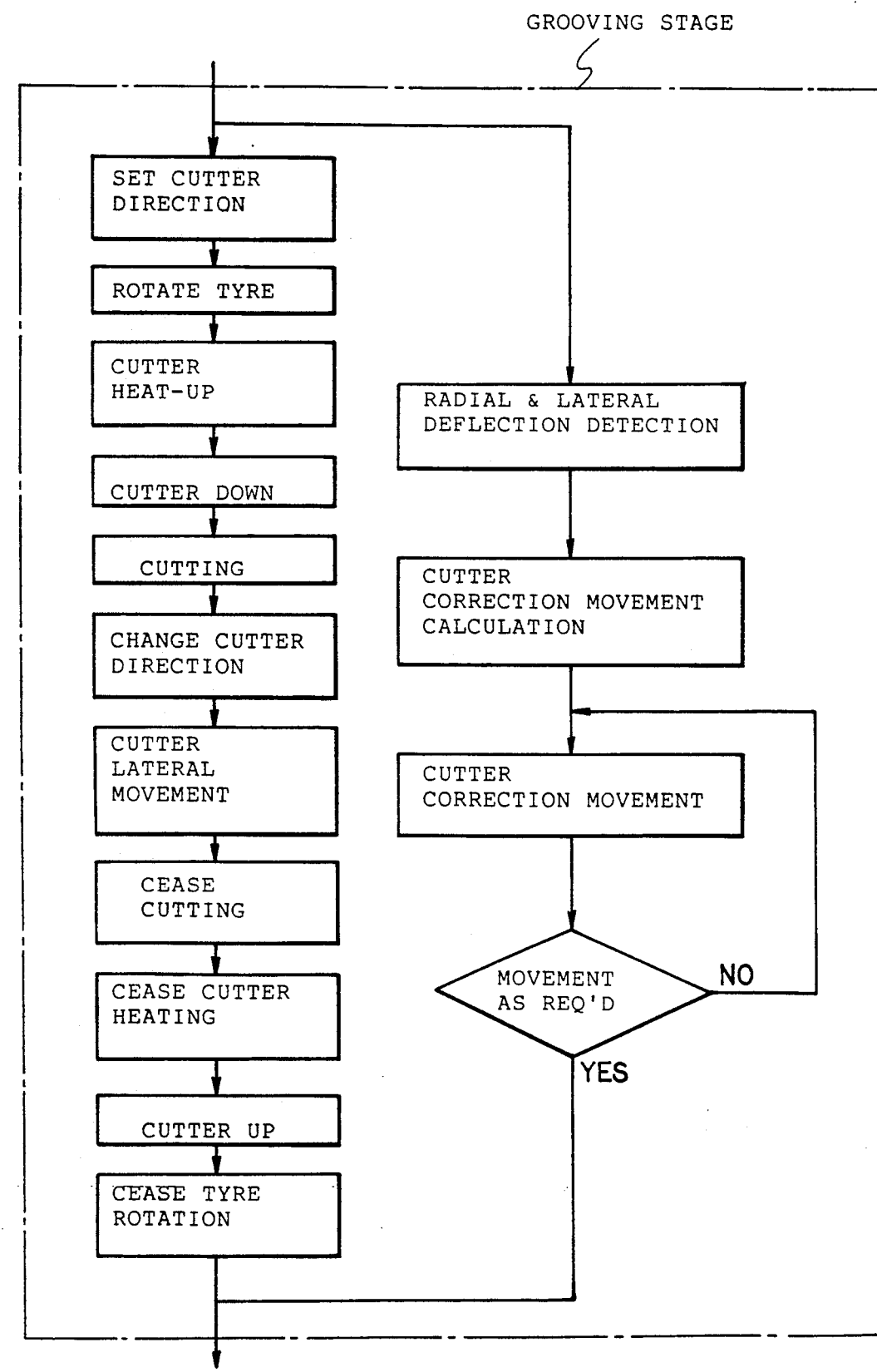
FIG. 22 is a supplemental flow chart showing details of the grooving stage block of FIG. 21.
Figure 23:
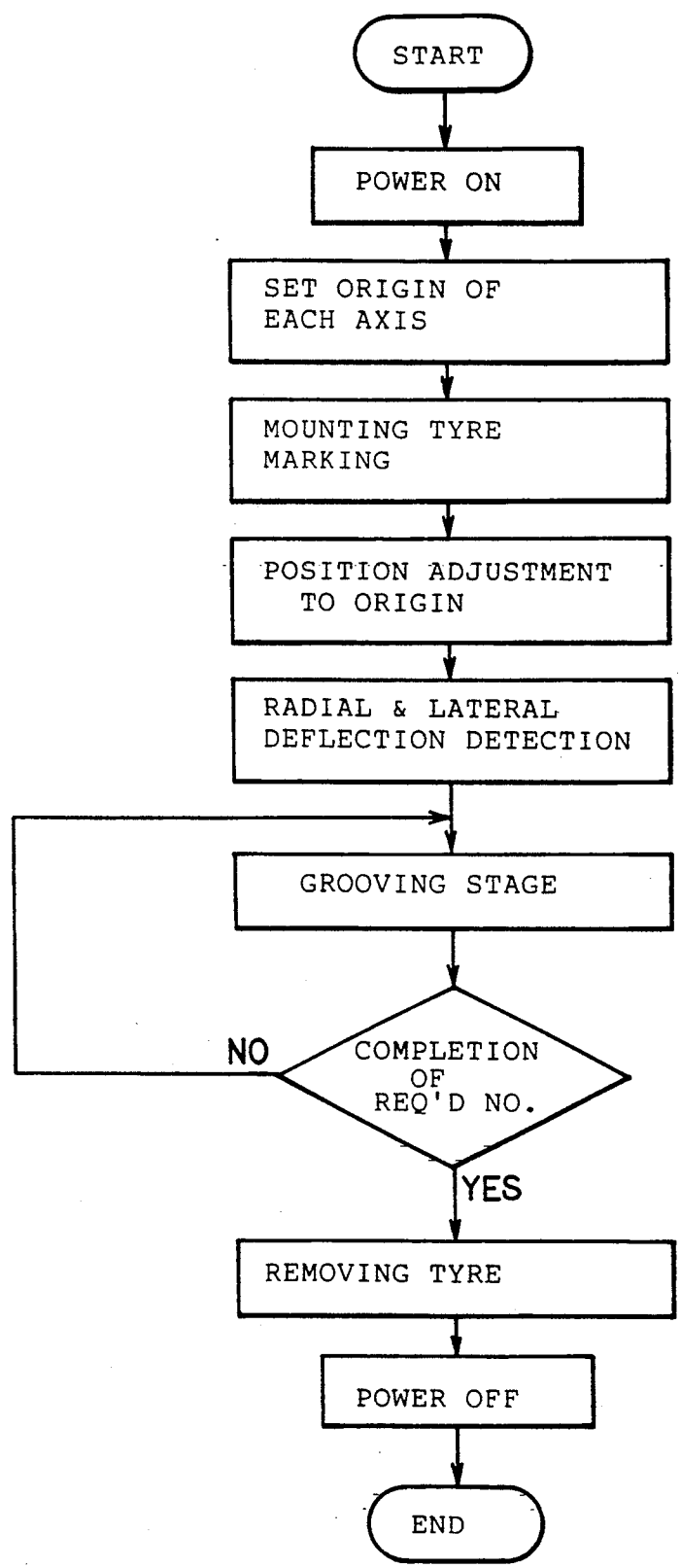
FIG. 23 is a flow chart showing still another example of the grooving operation using the apparatus of the first embodiment.
Figure 24:
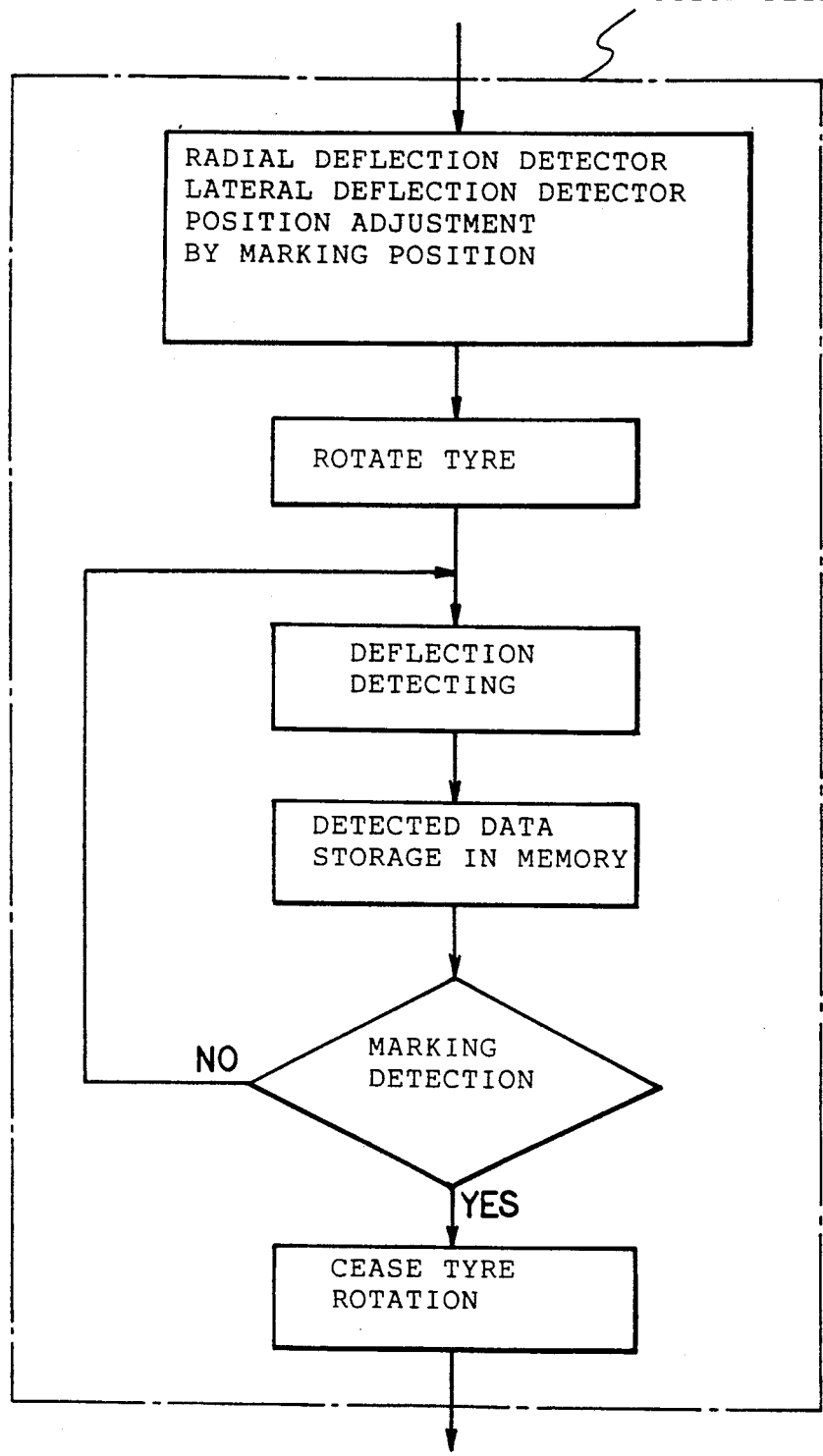
FIG. 24 is a supplemental flow chart showing details of the deflection detection block of FIG. 23.
Figure 25:
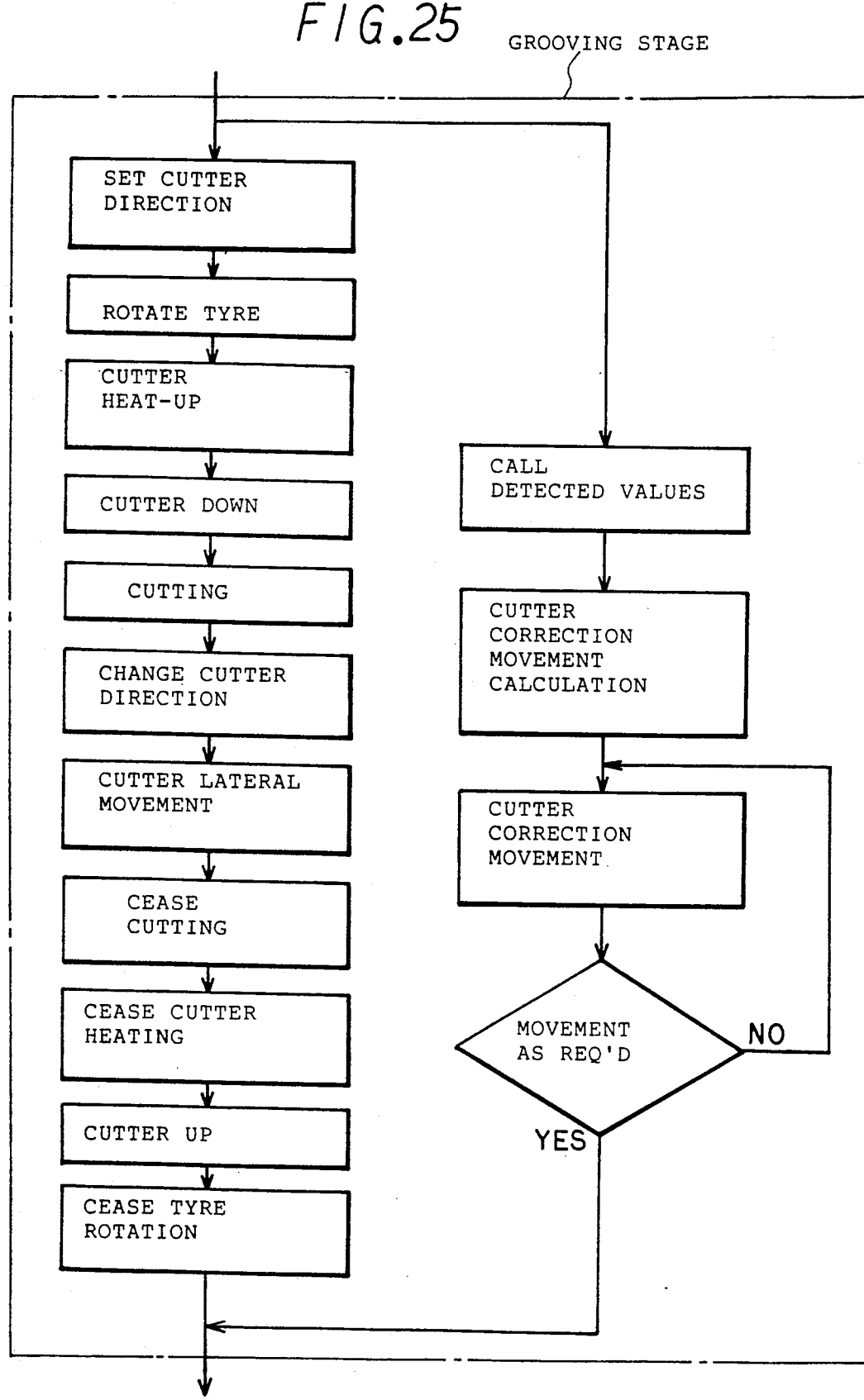
FIG. 25 is another supplemental flow chart showing details of the grooving stage block of FIG. 23.

With regard to FIGS. 22 to 24, it will be readily understood that in case of an apparatus capable of only radial or lateral compensation, the lateral deflection detection step or the radial deflection detection step will not be employed.

Thus, a grooving apparatus of the present invention may have a tire supporting unit; a cutter supporting unit; a rotating arm; a radially travelling stage supporting the rotating arm and having a radial reference mechanism and a radial correction mechanism; a laterally travelling stage supporting the radially travelling stage and having a lateral reference mechanism and a lateral correction mechanism; a radial deflection detector; a lateral deflection detector; and a control unit having a reference movement control section and a correction movement control section as shown in FIGS. 1, 2, 19 and 20.

And as shown in FIGS. 11, 12 and 21 through 25, a method of the present invention may include a step of detecting the radial tire deflection; a step of correcting the radial cutter movement based on the detected value of the radial tire deflection; a step of detecting the lateral tire deflection; and a step of correcting the lateral cutter movement based on the detected value. The respective detection step and the respective correction step corresponding thereto are conducted in parallel or in series (or in other words in a simultaneous operation or in separate operations).

Thus, in accordance with the present invention, the reference movement of the cutter is controlled by the main program, and the radial and/or lateral tire deflection is detected and then the correction movement given by the correction program based on the detected deflection values is superposed on the reference movement, so that the cutter position is controlled in the optimum position.

What we claim is:

1. An apparatus for compensating a radial deflection and a lateral deflection of a tire to be applied to a grooving apparatus wherein a cutter movement is controlled by a plurality of operating shafts and desired pattern grooves are formed in a tire surface, characterized in that the apparatus comprises a radial deflection detector for detecting a radial deflection of a tire in a direction of a tire diameter, a lateral deflection detector for detecting a lateral deflection of a tire in a direction of a tire width, a radially driving shaft which rotates under a control of a reference program to move a cutter in the direction of the tire diameter, a laterally driving shaft which rotates under a control of the reference program to move the cutter in the direction of the tire width, a radially correction shaft which is disposed in parallel with the radially driving shaft and rotates to radially move the cutter under a control of a correction program based on a detected value from the radial deflection detector, a laterally correction shaft which is disposed in parallel with the laterally driving shaft and rotates to laterally move the cutter under a control of a correction program based on a detected value from the lateral deflection detector;

a radially driving device for superposing a movement of the radially correction shaft on a movement of the radially driving shaft, and a laterally driving device for superposing a movement of the laterally correction shaft on a movement of the laterally driving shaft.

2. An apparatus of claim 1, wherein the radially driving shaft comprises a feed screw engaged with a first female threaded body rotatably supported by a radially travelling stage capable of radially moving the cutter,
a first driving gear rotated by the radially correction shaft and a driven gear which is integratedly connected to the first female thread body and is engaged with the first driving gears are provided, the laterally driving shaft comprises another feed screw engaged with a second female threaded body rotatably supported by a laterally travelling stage capable of laterally moving the cutter, and a second driving gear rotated by the laterally correction shaft and another driven gear which is integratedly connected to the second female threaded body and is engaged with the second driving gear are provided.

3. An apparatus of claim 1, wherein said radially driven shaft and said radially correcting shaft respectively include feed screws, one shaft selected from said radially driving shaft and said radially correction shaft is engaged with a first female threaded body fixed to a radially travelling stage capable of radially moving the cutter,
the other shaft selected from said radially driving shaft and said radially correction shaft is engaged with a first female threaded portion of a first intermediate supporting stage for supporting the first shaft and is attached to a fixed member,
said laterally driving shaft and said laterally correction shaft respectively include feed screws, one shaft selected from said laterally driving shaft and said laterally correction shaft is engaged with a second female threaded body fixed to a laterally travelling stage capable of laterally moving the cutter, and
the other shaft selected from said laterally driving shaft and said laterally correction shaft is engaged with a second female threaded portion of a second intermediate supporting stage for supporting said one shaft selected from said laterally driven shaft and said laterally correction shaft.

4. An apparatus for compensating a radial deflection of a tire to be applied to a grooving apparatus wherein a cutter movement is controlled by a plurality of operating shafts and desired pattern grooves are formed in a tire surface, characterized in that the apparatus comprises a radial deflection detector for detecting a radial deflection of a tire in a direction of a tire diameter,
a radially driving shaft which rotates under a control of a reference program to move a cutter in the direction of the tire diameter,
a radially correction shaft which is disposed in parallel with the radially driving shaft and rotates to radially move the cutter under a control of a correction program based on a detected value from the radial deflection detector,
and a radially driving device for superposing a movement of the radially correction shaft on a movement of the radially driving shaft.

5. An apparatus of claim 4, wherein the radially driving shaft comprises a feed screw engaged with a female threaded body rotatably supported by a radially travelling stage capable of radially moving the cutter, and a driving gear rotated by the radially correction shaft which is disposed in parallel with the radially driving shaft and a driven gear which is integratedly connected to the female threaded body and is engaged with the driving gear are provided.

6. An apparatus of claim 4, wherein the radially driving shaft and the radially correction shaft respectively include feed screws,
one shaft selected from said radially driving shaft and said radially correction shaft is engaged with a female threaded body fixed to a radially travelling stage capable of radially moving the cutter, and
the other shaft selected from said radially driving shaft and said radially correcting shaft is engaged with a female threaded portion of an intermediate supporting stage for supporting said one shaft selected from said radially driving shaft and said radially correction shaft and is attached to a fixed member.

7. An apparatus for compensating a lateral deflection of a tire to be applied to a grooving apparatus wherein a cutter movement is controlled by a plurality of operating shafts and desired pattern grooves are formed in a tire surface, characterized in that the apparatus comprises a lateral deflection detector for detecting a lateral deflection of a tire in a direction of a tire width,
a laterally driving shaft which rotates under a control of the reference program to move the cutter in the direction of the tire width,
a laterally correction shaft which is disposed in parallel with the laterally driving shaft and is rotates to laterally move the cutter under a control of a correction program based on a detected value from the lateral deflection detector, and
a laterally driving device for superposing a movement of the laterally correction shaft on a movement of the laterally driving shaft.

8. An apparatus of claim 7, wherein the laterally driving shaft comprises a feed screw engaged with a female threaded body rotatably supported by a laterally travelling stage capable of laterally moving the cutter, and
a driving gear rotated by the laterally correction shaft which is disposed parallel with the laterally driving shaft and a driven gear which is integratedly connected to the female threaded body and is engaged with the driving gear are provided.

9. An apparatus of claim 10, wherein the laterally driving shaft and the laterally correction shaft respectively include feed screws,
one shaft selected from said laterally driving shaft and said laterally correction shaft is engaged with a female threaded body fixed to a laterally travelling stage capable of laterally moving the cutter, and
the other shaft selected from said laterally driving shaft and said laterally correction shaft is engaged with a female threaded portion of an intermediate supporting stage for supporting said one shaft selected from said laterally driving shaft and said laterally driven shaft.

* * * * *